United States Patent
Asakura et al.

(10) Patent No.: US 10,624,142 B2
(45) Date of Patent: Apr. 14, 2020

(54) COMMUNICATION DEVICE AND A NON-TRANSITORY COMPUTER-READABLE RECORDING MEDIUM

(71) Applicant: Brother Kogyo Kabushiki Kaisha, Nagoya-shi, Aichi-ken (JP)

(72) Inventors: Hirotaka Asakura, Nagoya (JP); Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/027,497

(22) Filed: Jul. 5, 2018

(65) Prior Publication Data

US 2019/0014608 A1 Jan. 10, 2019

(30) Foreign Application Priority Data

Jul. 5, 2017 (JP) .................................. 2017-132196

(51) Int. Cl.
*H04B 7/00* (2006.01)
*H04M 1/00* (2006.01)
(Continued)

(52) U.S. Cl.
CPC ........... *H04W 76/14* (2018.02); *H04W 12/08* (2013.01); *G06F 3/1204* (2013.01);
(Continued)

(58) Field of Classification Search
CPC ....... H04W 4/80; H04W 8/005; H04W 12/08; H04W 48/18; H04W 76/10; H04W 76/14;
(Continued)

(56) References Cited

U.S. PATENT DOCUMENTS 8,947,239 B1 * 2/2015 Park ................... G06K 7/10237
455/41.2
10,075,530 B2 * 9/2018 Park ....................... H04L 67/12
(Continued)

FOREIGN PATENT DOCUMENTS

JP 2016049666 A 4/2016

OTHER PUBLICATIONS

Wi-Fi Peer to Peer (P2P) Technical; Version 1.5; 2014 Wi-Fi Alliance; pp. 1-83.

*Primary Examiner* — Quochien B Vuong
(74) *Attorney, Agent, or Firm* — Banner & Witcoff, Ltd.

(57) ABSTRACT

A communication device is described as including: a first wireless interface; a second wireless interface; a processor; and a memory storing computer-readable instructions therein, the computer-readable instructions, when executed by the processor, causing the communication device to: receive, via the second wireless interface, a connection request from a first external device; after receiving the connection request from the first external device, establish, via the first wireless interface, a connection with a second external device, wherein the second external device is different from the first external device; transmit information to the second external device, wherein the information prevents the second external device from establishing, via the second wireless interface, a connection with the communication device; and establish, via the second wireless interface, a connection with the first external device.

20 Claims, 19 Drawing Sheets

(51) Int. Cl.
*H04W 76/14* (2018.01)
*H04W 12/08* (2009.01)
*G06F 3/12* (2006.01)
*H04W 84/12* (2009.01)

(52) U.S. Cl.
CPC .......... *G06F 3/1236* (2013.01); *G06F 3/1292* (2013.01); *H04W 84/12* (2013.01)

(58) Field of Classification Search
CPC ... H04W 76/15; H04W 84/12; H04M 1/7253; H04M 11/00; G06F 3/1204; G06F 3/1236
USPC .... 455/41.1, 41.2, 41.3, 552.1, 553.1, 556.1
See application file for complete search history.

(56) References Cited

U.S. PATENT DOCUMENTS

| | | | |
|---|---|---|---|
| 10,123,268 B2 * | 11/2018 | Bhargava | H04B 7/15507 |
| 2015/0281875 A1 * | 10/2015 | Shin | H04W 76/36 |
| | | | 455/41.2 |
| 2015/0382364 A1 * | 12/2015 | Sharma | H04W 72/082 |
| | | | 370/329 |
| 2016/0066275 A1 | 3/2016 | Tsuzuki | |
| 2016/0150582 A1 * | 5/2016 | Jung | H04W 4/70 |
| | | | 455/41.1 |
| 2018/0124847 A1 * | 5/2018 | Nishida | H04W 76/14 |

\* cited by examiner

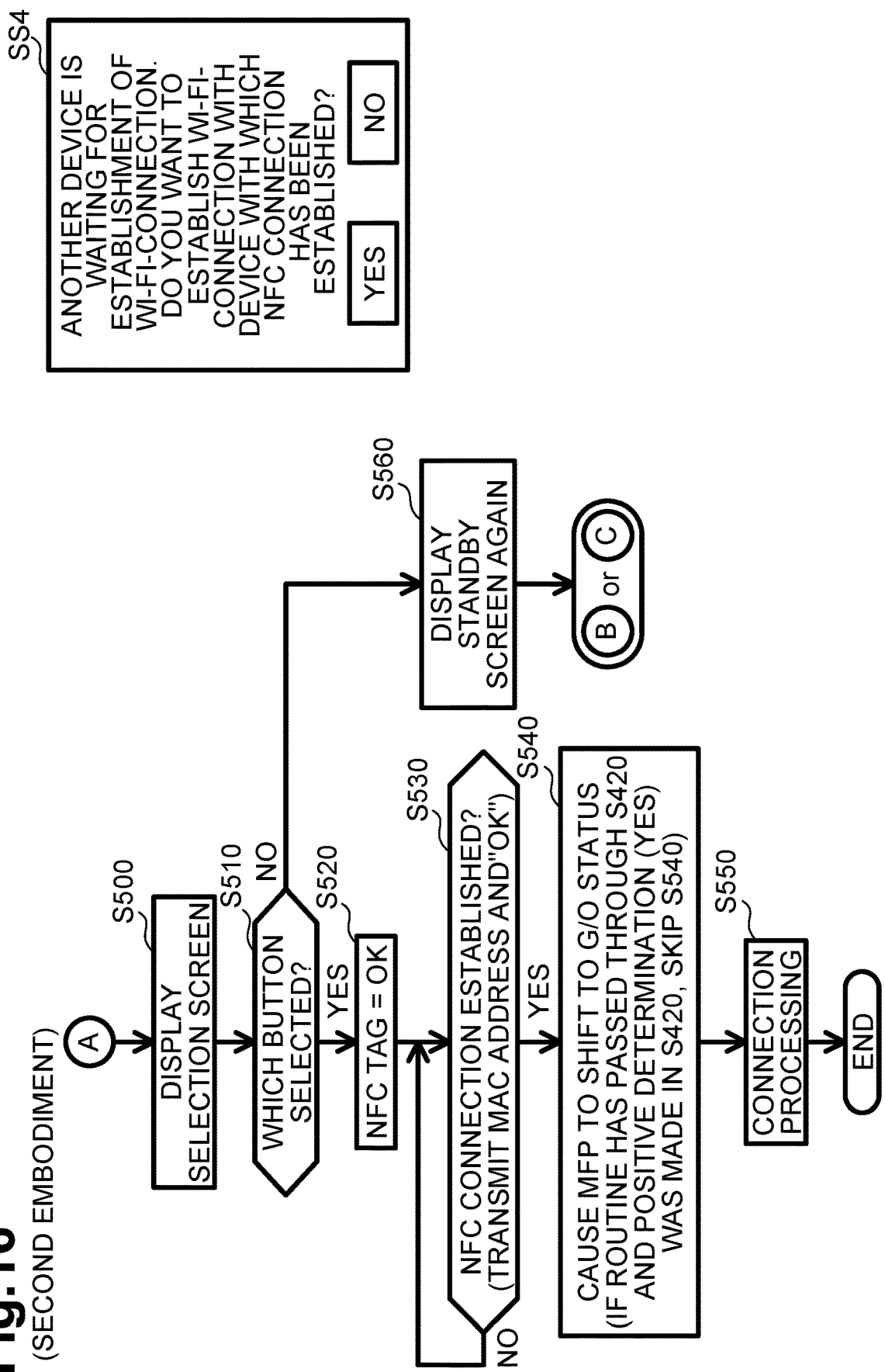

Fig.17

(SECOND EMBODIMENT)
(CASE G)

MOBILE TERMINAL 100

MFP (DEVICE STATUS) 10

MOBILE TERMINAL 200

SIMILAR OR SAME PROCESSING TO T210 TO T224 IN Fig. 8
MFP 10 RECEIVES G/O NEGOTIATION REQUEST FROM MOBILE TERMINAL 100 AND DISPLAYS STANDBY SCREEN

SS4
ANOTHER DEVICE IS WAITING FOR ESTABLISHMENT OF WI-FI-CONNECTION. DO YOU WANT TO ESTABLISH WI-FI-CONNECTION WITH DEVICE WITH WHICH NFC CONNECTION HAS BEEN ESTABLISHED?
YES | NO (T826) START MFP APPLICATION AND BRING MOBILE TERMINAL CLOSE TO MFP (T828) NFC CONNECTION (T829) "M10"+"NG"

(T832) DISPLAY SELECTION SCREEN SS4

(T834) SELECTING OPERATION (IN "NO" CASE)

(T836) DISPLAY STANDBY SCREEN SS2 AGAIN (T838) USER INPUT

SIMILAR OR SAME PROCESSING TO T227 TO T240 IN Fig. 8
MFP 10 ESTABLISHES WI-FI CONNECTION WITH MOBILE TERMINAL 100

(T834) SELECTING OPERATION (IN "YES" CASE)

(T839) BRING MOBILE TERMINAL CLOSE TO MFP (T840) NFC CONNECTION (T842) "M10"+"OK"

(T844) SHIFT TO G/O STATUS (T846) GENERATE SSID

SIMILAR OR SAME PROCESSING TO T326 TO T340 IN Fig. 9
MFP 10 ESTABLISHES WI-FI CONNECTION WITH MOBILE TERMINAL 200

Fig.18

(SECOND EMBODIMENT)
(CASE H)

MOBILE TERMINAL 100

MFP (G/O STATUS) 10

MOBILE TERMINAL 200

SIMILAR OR SAME PROCESSING TO T510 TO T528 IN Fig. 12
MFP 10 RECEIVES PROVISION DISCOVERY REQUEST FROM MOBILE TERMINAL 100 AND DISPLAYS STANDBY SCREEN (T926) START MFP APPLICATION AND BRING MOBILE TERMINAL CLOSE TO MFP (T928) NFC CONNECTION (T929) "M10"+"NG"

(T932) DISPLAY SELECTION SCREEN SS4

(T934) SELECTING OPERATION (IN "NO" CASE)

(T936) DISPLAY STANDBY SCREEN SS2 AGAIN (T938) USER INPUT

SIMILAR OR SAME PROCESSING TO T531 TO T538 IN Fig. 12
MFP 10 ESTABLISHES WI-FI CONNECTION WITH MOBILE TERMINAL 100

(T934) SELECTING OPERATION (IN "YES" CASE)

(T939) BRING MOBILE TERMINAL CLOSE TO MFP (T940) NFC CONNECTION (T942) "M10"+"OK"

SIMILAR OR SAME PROCESSING TO T626 TO T640 IN Fig. 13
MFP 10 ESTABLISHES WI-FI CONNECTION WITH MOBILE TERMINAL 200

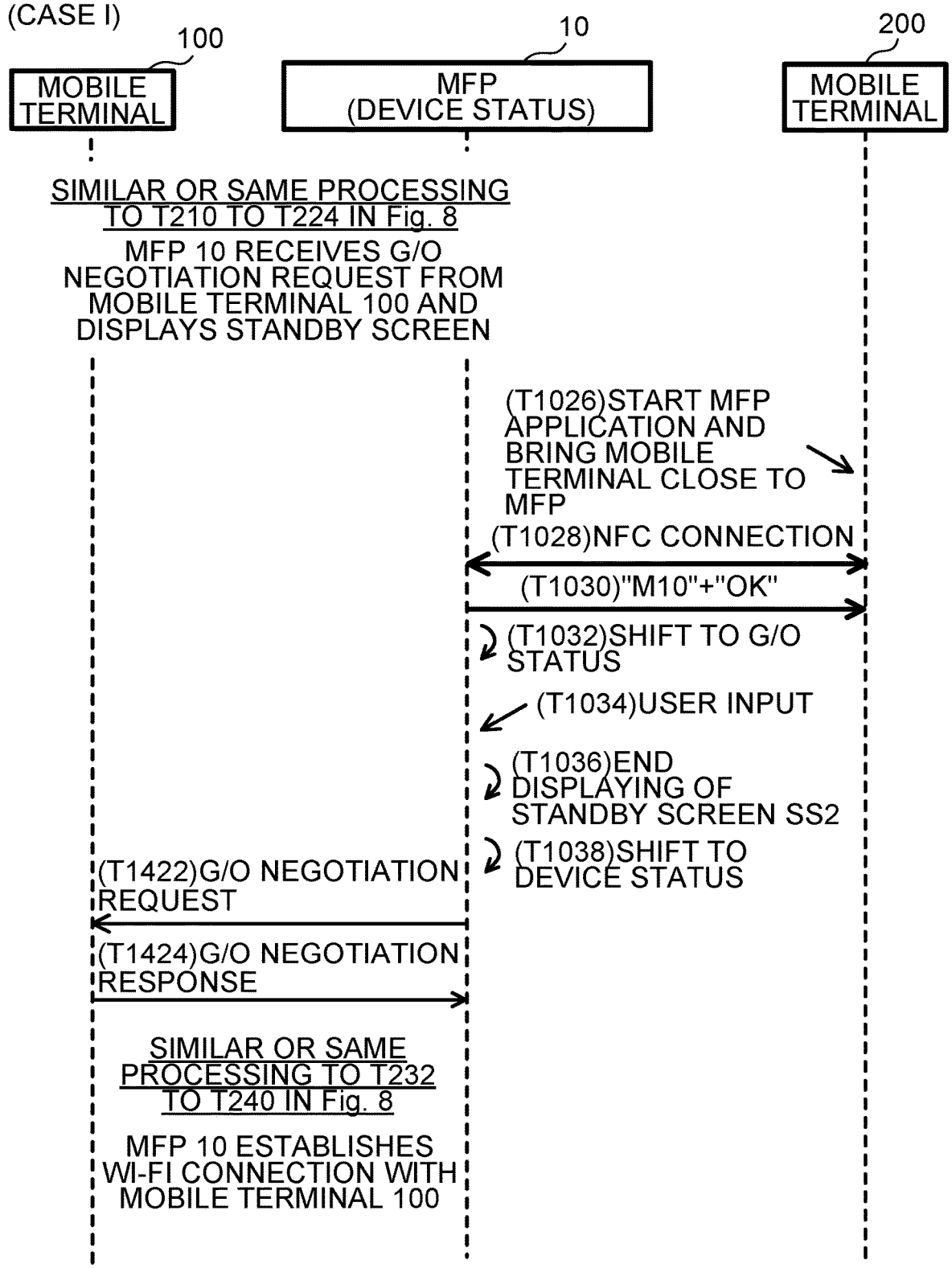

COMMUNICATION DEVICE AND A NON-TRANSITORY COMPUTER-READABLE RECORDING MEDIUM

CROSS-REFERENCE TO RELATED APPLICATION

This application claims priority from Japanese Patent Application No. 2017-132196 filed on Jul. 5, 2017, the content of which is incorporated herein by reference in its entirety.

TECHNICAL FIELD

Aspects of the disclosure relates to a communication device capable of establishing a wireless connection with an external device.

BACKGROUND

For establishing between two target devices a wireless connection that complies with a Wi-Fi® (Wi-Fi® is a registered certification mark owned by the Wi-Fi Alliance of Austin, Tex.) protocol, for example, a Wi-Fi Protected Setup™ (Wi-Fi Protected Setup™ is a trademark owned by the Wi-Fi Alliance of Austin, Tex.) ("WPS") may be used. For example, in response to receipt of a connection request from a first target device, a second target device displays a standby screen for waiting for input of a user operation (e.g., a push button operation). In response to acceptance of the user operation while the standby screen is displayed on the second target device, the first and second target devices execute communication using the WPS, i.e., the first and second target devices exchange therebetween wireless setup information for establishing a wireless connection, thereby establishing therebetween a wireless connection that complies with the Wi-Fi® protocol. As described above, the user may be allowed to establish a wireless connection between two target devices by such a simple operation, e.g., a push button operation.

In another example, for establishing between two target devices a wireless connection that complies with the Wi-Fi® protocol, in response to execution of short range wireless communication such as Near Field Communication ("NFC") between two target devices, these devices execute communication using the WPS to establish therebetween a wireless connection that complies with the Wi-Fi® protocol. Such techniques for establishing a wireless connection that complies with the Wi-Fi® protocol are specified in the "Wi-Fi Peer-to-Peer (P2P) Technical Specification Version 1.5" created by the Wi-Fi Alliance in 2014.

SUMMARY

Nevertheless, a conventional approach has not considered that a communication device may receive at close timing connection requests from a first external device and a second external device. Accordingly, some embodiments of the disclosure provide a technique for enabling the communication device to establish a wireless connection with an appropriate one of external devices where the communication device receives a connection request from one of the external devices despite shortly later receiving a short range communication with another of the external devices.

One or more aspects of the disclosure relate to a communication device that selectively connects with one of a plurality of external devices based on the order in which the plurality of external devices attempted to establish a communication with the communication device.

For instance, the communication device may receive, via the second wireless interface, a connection request from a first external device; after receiving the connection request from the first external device, establish, via the first wireless interface, a connection with a second external device, wherein the second external device is different from the first external device; transmit information to the second external device, wherein the information prevents the second external device from establishing, via the second wireless interface, a connection with the communication device; and establish, via the second wireless interface, a connection with the first external device.

In one or more aspects, a communication device may have two wireless interfaces. In response to a connection request received via the second wireless interface from a first external device, the communication device may wait for user confirming the connection. A wireless connection via the first wireless interface may be subsequently established between the communication device and the second external device. Where the first user performs an operation on the operation interface while the standby screen is displayed, the first user more likely desires to establish a wireless connection between the first external device and the communication device. Thus, the communication device establishes a wireless connection with the first external device via the second wireless interface rather than the second external device. One or more aspects include a communication device that receives, via the second wireless interface, a connection request from the first external device and then establishes, via the first wireless interface, a wireless connection with the second external device. Afterward, the communication device successfully establishes, via the second wireless interface, a wireless connection with the first external device without establishing, via the second wireless interface, a wireless connection with the second external device.

Control methods and computer programs for implementing the above-described communication device, and computer-readable storage media storing the computer programs may have novelty and utility. Communication systems including the above-described communication device and the external device (e.g., the first external device and/or the second external device) may also have novelty and utility.

BRIEF DESCRIPTION OF THE DRAWINGS

Aspects of the disclosure are illustrated by way of example and not by limitation in the accompanying figures in which like reference characters indicate similar elements.

FIG. 16 is a flowchart of processing executed by the multifunction peripheral in a second embodiment according to one or more aspects of the disclosure.

FIG. 17 is a sequence diagram representing interactions between the multifunction peripheral and the mobile terminals in case G in which an NFC connection becomes established when the multifunction peripheral is in the device status and the standby screen is being displayed in the second embodiment according to one or more aspects of the disclosure.

FIG. 18 is a sequence diagram representing interactions between the multifunction peripheral and the mobile terminals in case H in which an NFC connection becomes established when the multifunction peripheral is in the G/O status and the standby screen is being displayed in the second embodiment according to one or more aspects of the disclosure.

FIG. 19 is a sequence diagram representing interactions between the multifunction peripheral and the mobile terminals in case I in which an NFC connection becomes established when the multifunction peripheral is in the device status and the standby screen is being displayed in a third embodiment according to one or more aspects of the disclosure.

DETAILED DESCRIPTION

First Embodiment

Figure 1:
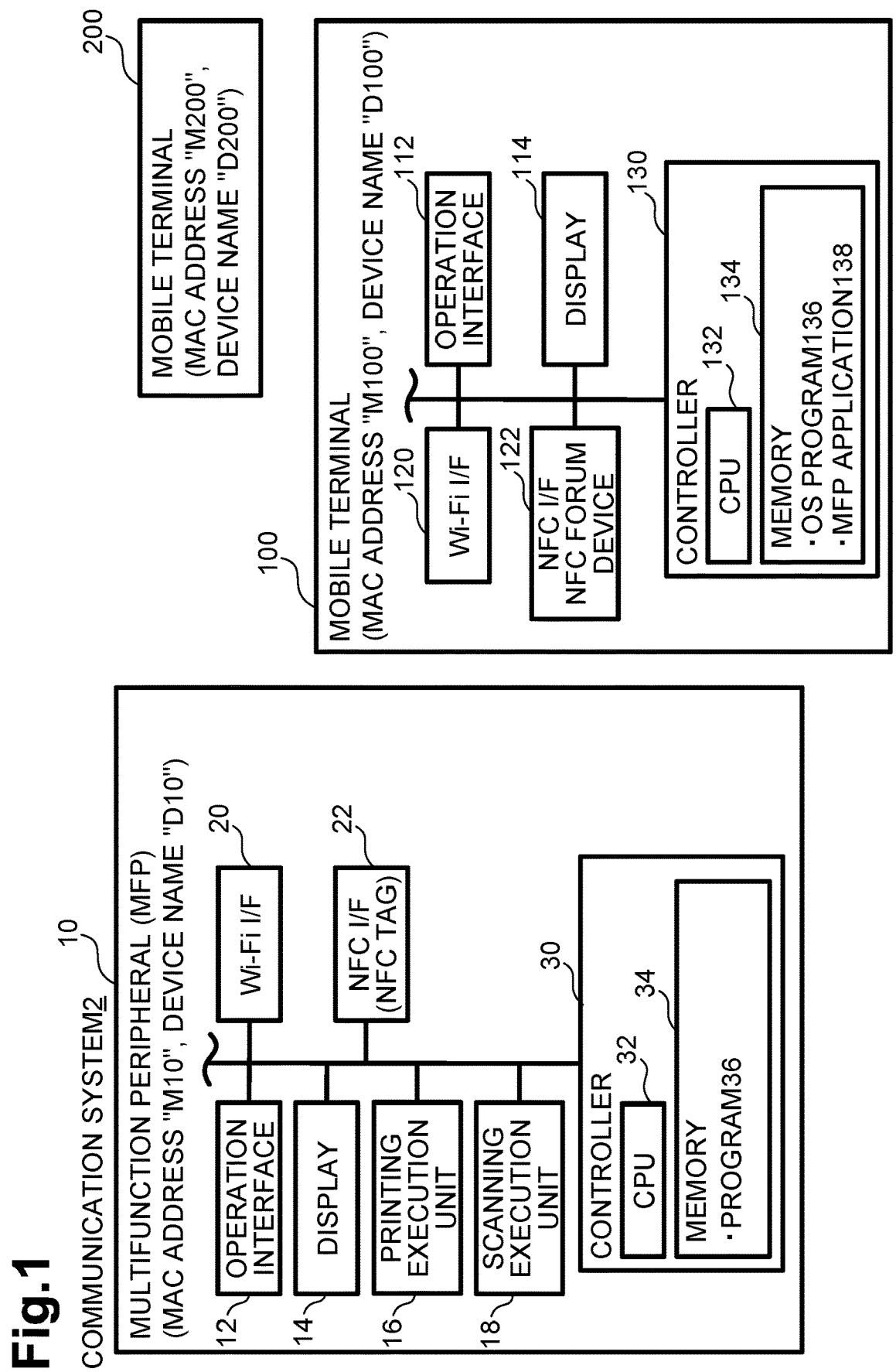
FIG. 1 represents a configuration of a communication system in a first embodiment according to one or more aspects of the disclosure.

Configuration of Communication System 2; FIG. 1

As illustrated in FIG. 1, a communication system 2 includes a multifunction peripheral ("MFP") 10, a mobile terminal 100, and a mobile terminal 200. Each of the multifunction peripheral 10, the mobile terminal 100, and the mobile terminal 200 is configured to execute wireless communication that complies with a Wi-Fi® (Wi-Fi® is a registered certification mark owned by the Wi-Fi Alliance of Austin, Tex.) protocol (hereinafter, also referred to as "Wi-Fi® communication"). Each of the multifunction peripheral 10, the mobile terminal 100, and the mobile terminal 200 is further configured to execute wireless communication that complies with a Near Field Communication ("NFC") protocol (hereinafter, also referred to as "NFC communication").

Configuration of MFP 10

The MFP 10 may be a peripheral device capable of performing multiple functions including, for example, a printing function and a scanning function. The MFP 10 is assigned with a MAC address "M10" and a device name "D10". The MFP 10 includes an operation interface 12, a display 14, a printing execution unit 16, a scanning execution unit 18, a Wi-Fi® interface ("I/F") 20, an NFC I/F 22, and a controller 30.

The operation interface 12 includes a plurality of keys or buttons. The operation interface 12 may enable a user to input various instructions to the MFP 10 by operating the operation interface 12. The display 14 is configured to display various information thereon. The display 14 includes a touch screen and also serves as an operation interface. The printing execution unit 16 may be a printing mechanism using an inkjet printing method or a laser printing method. The scanning execution unit 18 may be a scanning mechanism including, for example, a charge-coupled device ("CCD") or a complementary metal oxide semiconductor ("CMOS").

The Wi-Fi® I/F 20 is a wireless interface for enabling Wi-Fi® communication that complies with the Wi-Fi® protocol. In the Wi-Fi® protocol, wireless communication is executed in compliance with, for example, the standard IEEE (The Institute of Electrical and Electronics Engineers, Inc.) 802.11 and its family standards (e.g., 802.11a, 802.11b, 802.11g, and 802.11n). The Wi-Fi® I/F 20 supports a Wi-Fi Direct™ (Wi-Fi Direct™ is a certification mark owned by the Wi-Fi Alliance of Austin, Tex.) ("WFD") protocol developed by the Wi-Fi Alliance particularly, and enables wireless communication in compliance with the WFD protocol. The WFD protocol is wireless communication specified in "Wi- Fi Peer-to-Peer (P2P) Technical Specification Version 1.5" created by the Wi-Fi Alliance.

The MFP 10 is configured to operate in one of a Group Owner ("G/O") status, a Client ("CL") status, and a device status ("Device Status") of the WFD protocol. When the MFP 10 is in the G/O status, the MFP 10 may configure a WFD network ("WFDNW") in which the MFP 10 operates as a master station (i.e., a G/O) and an external device operates as a slave station. When the external device is in the G/O status, the MFP 10 operates in the CL status. The MFP 10 may participate as a slave station (i.e., a CL) in a WFDNW configured by the external device. When the MFP 10 is in the device status, the MFP 10 is not in the G/O status or in the CL status. That is, the MFP 10 has not established a connection with any external device.

The Wi-Fi® I/F 20 also supports a Wi-Fi Protected Setup™ (Wi-Fi Protected Setup™ is a trademark owned by the Wi-Fi Alliance of Austin, Tex.) ("WPS") developed by the Wi-Fi Alliance. The WPS is called an automatic wireless setup or simple wireless setup. The WPS enables one target device and another target device to establish a wireless connection in compliance with the Wi-Fi® protocol (hereinafter, referred to as a "Wi-Fi® connection") therebetween readily without requiring any user entry of wireless setup information (e.g., a password, authentication method, and encryption method) for establishing the Wi-Fi® connection. The Wi-Fi® I/F 20 also supports a push-button configuration ("PBC") protocol of the WPS. The PBC protocol enables one target device and another target device to establish a Wi-Fi® connection therebetween in response to a user operation (e.g., a push button operation) on each of the devices for establishing a wireless connection.

The NFC I/F 22 is a wireless interface for enabling NFC communication that complies with the NFC protocol. The NFC protocol is a wireless communication protocol in compliance with the International standard, e.g., ISO/IEC 14443, ISO/IEC 15693, or ISO/IEC 18092. Interfaces for enabling NFC communication include, for example, an NFC Forum device and an NFC Forum tag. In the first embodiment, the NFC I/F 22 is an NFC Forum tag. Nevertheless, in other embodiments, for example, the NFC I/F 22 may be an NFC Forum device.

A communication method may be different between the Wi-Fi® I/F 20 and the NFC I/F 22. A communication speed in the Wi-Fi® communication via the Wi-Fi® I/F 20 is faster than a communication speed in the NFC protocol via the NFC I/F 22. More specifically, for example, the maximum communication speed in the Wi-Fi® communication may be between 11 and 600 Mbps and the maximum communication speed in the NFC communication may be between 100 and 424 Kbps. Further, the Wi-Fi® communication via the Wi-Fi® I/F 20 uses a different carrier frequency from the NFC communication via the NFC I/F 22. More specifically, for example, the Wi-Fi® communication may use a 2.4 GHz band or a 5.0 GHz band and the NFC communication may use a 13.56 MHz band. The maximum communicable range in the Wi-Fi® communication via the Wi-Fi® I/F 20 is greater than the maximum communicable range in the NFC communication via the NFC I/F 22. More specifically, for example, the maximum communicable range in the Wi-Fi® communication may be approximately 100 m and the maximum communicable range in the NFC communication may be approximately 10 cm.

The controller 30 includes a CPU 32 and a memory 34. The CPU 32 is configured to execute various processing in accordance with a program 36 (e.g., instructions) stored in the memory 34. The memory 34 may include a volatile memory and a nonvolatile memory.

Configuration of Mobile Terminal 100

The mobile terminal 100 may be, for example, a mobile phone, smartphone, personal digital assistant, laptop computer, tablet computer, mobile music player, or mobile movie player. The mobile terminal 100 is assigned with a MAC address "M100" and a device name "D100". The mobile terminal 100 includes an operation interface 112, a display 114, a Wi-Fi® I/F 120, an NFC I/F 122, and a controller 130.

The operation interface 112 includes a plurality of keys or buttons. The operation interface 112 may enable a user to input various instructions to the terminal program 138 by operating the operation interface 112. The display 114 is configured to display various information thereon. The display 114 includes a touch screen and also serves as an operation interface. The Wi-Fi® I/F 120 has the same or similar configuration to the Wi-Fi® I/F 20 of the MFP 10. The NFC I/F 122 may be an NFC Forum device and is configured to operate in one of a Peer-to-Peer (P2P) mode, a Reader mode, a Writer mode, and a Card Emulation ("CE") mode of the NFC protocol. In particular, in the first embodiment, the NFC I/F 122 is configured to operate in the Reader mode of the NFC protocol to read (i.e., receive) information from the NFC I/F 22 of the MFP 10. The NFC I/F 122 is further configured to operate in the Writer mode of the NFC protocol to write (i.e., transmit) information into the NFC I/F 22 of the MFP 10.

The controller 130 includes a CPU 132 and a memory 134. The CPU 132 is configured to execute various processing in accordance with a program 136 and/or an MFP application 138 stored in the memory 134. The program 136 may be an operating system ("OS") program configured to control basic operations of the mobile terminal 100. The memory 134 stores the MFP application 138. The MFP application 138 is provided by a vendor of the MFP 10. For example, the MFP application 138 may be served by a server on the Internet. The MFP application 138 may be downloaded from the server and installed on the mobile terminal 100. The MFP application 138 enables Wi-Fi® communication between the mobile terminal 100 and the MFP 10 and data communication of target data (e.g., print data or scan data) between the mobile terminal 100 and the MFP 10.

The mobile terminal 200 has the same or similar configuration to the mobile terminal 100 except that the mobile terminal 200 is assigned with a MAC address "M200" and a device name "D200".

Figure 2:
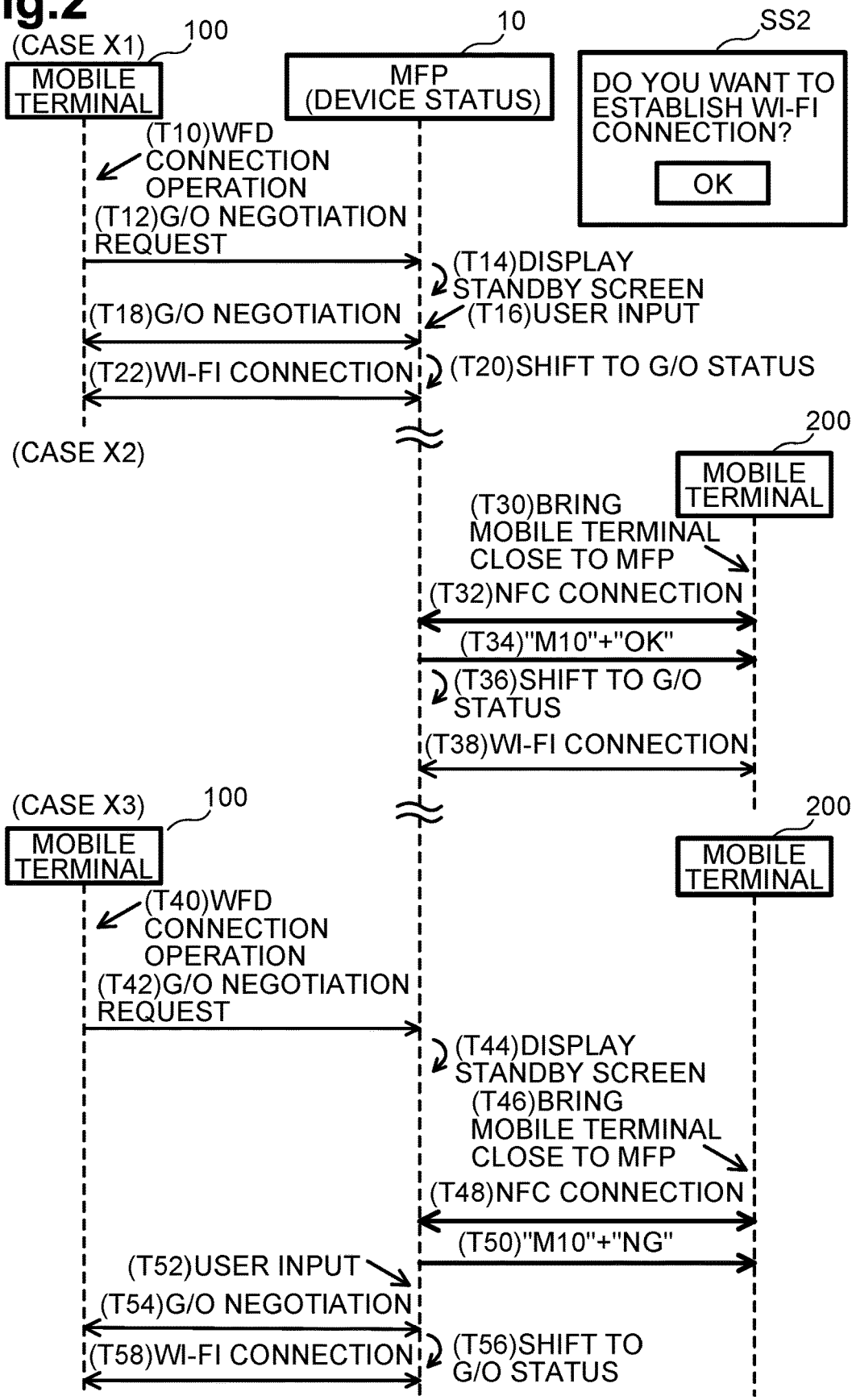
FIG. 2 is a sequence diagram representing interactions between a multifunction peripheral and mobile terminals in each of cases X1, X2, and X3 which may occur when the multifunction peripheral is in a device status in the first embodiment according to one or more aspects of the disclosure.

Cases X1, X2, and X3; FIG. 2

Referring to FIG. 2, example cases X1, X2, and X3 will be described. Cases X1, X2, and X3 occur sequentially when the MFP 10 operates in the device status. In each of cases X1, X2, and X3, the MFP 10 establishes a wireless connection with one of the mobile terminals 100 and 200. Each of cases X1, X2, and X3 helps understanding of processing illustrated in FIGS. 3 and 4. Therefore, actual processing may include one or more other processing that are not executed in cases X1, X2, and X3. Hereinafter, for easier understanding, each processing executed by the CPU 32 of the MFP 10 and each processing executed by the CPU 132 of each of the mobile terminals 100 and 200 will be explained while its corresponding device (i.e., the MFP 10, the mobile terminal 100, or the mobile terminal 200), instead of each CPU itself, is defined as an agent or doer. In the sequence diagrams, thin arrows indicated between the MFP 10 and either of the mobile terminals 100 and 200 represent NFC communication, and thick arrows indicated between the MFP 10 and either of the mobile terminals 100 and 200 represent Wi-Fi® communication.

In case X1, where a WFD connection operation is performed on the operation interface 112 of the mobile terminal 100, a Wi-Fi® connection becomes established between the MFP 10 having the device status and the mobile terminal 100. In step T10, the mobile terminal 100 accepts a WFD connection operation performed on the operation interface 112 by a user of the mobile terminal 100. In response, in step T12, the mobile terminal 100 transmits a G/O negotiation request to the MFP 10.

In step T14, in response to receipt of the G/O negotiation request from the mobile terminal 100 in step T12, the MFP 10 displays a standby screen SS2 on the display 14. In step T16, the MFP 10 accepts user input as selecting an OK button on the standby screen SS2 by the user of the mobile terminal 100. In response, in step T18, the MFP 10 executes a G/O negotiation with the mobile terminal 100.

In case X1, it is determined, as a result of the G/O negotiation, that the MFP 10 becomes a G/O. Thus, in step T20, the MFP 10 shifts to the G/O status from the device status. Thereafter, the MFP 10 executes connection processing for establishing a connection with the mobile terminal 100. Thus, in step T22, the MFP 10 establishes a Wi-Fi® connection with the mobile terminal 100.

In case X2, establishment of a Wi-Fi® connection between the MFP 10 and the mobile terminal 200 is triggered by establishment of an NFC connection therebetween. In step T30, a user brings the mobile terminal 200 close to the MFP 10. In response, in step T32, an NFC connection is established between an NFC I/F (not illustrated) of the mobile terminal 200 and the NFC I/F 22 of the MFP 10.

In step T34, in response to the establishment of the NFC connection in step T32, the MFP 10 transmits the own MAC address "M10" and information "OK" to the mobile terminal 200 through the NFC connection. The information "OK" may indicate that the MFP 10 is allowed to establish a Wi-Fi® connection with an external device with being triggered by establishment of an NFC connection with the external device. Subsequent to step T34, in step T36, the MFP 10 shifts to the G/O status from the device status without executing a G/O negotiation with the mobile terminal 200. Thereafter, the MFP 10 executes connection processing for establishing a connection with the mobile terminal 200.

Thus, in step T38, the MFP 10 establishes a Wi-Fi® connection with the mobile terminal 200.

In case X3, while the standby screen SS2 is displayed on the MFP 10 in case X1, an NFC connection becomes established between the MFP 10 and the mobile terminal 200. Processing executed in each of steps T40 to T44 is the same or similar to the processing executed in each of steps T10 to T14, respectively, described in case X1. While the standby screen SS2 is displayed (i.e., prior to acceptance of user input to the OK button), in step T46, a user brings the mobile terminal 200 close to the MFP 10. In response, in step T48, an NFC connection is established between an NFC I/F (not illustrated) of the mobile terminal 200 and the NFC I/F 22 of the MFP 10.

In step T50, in response to the establishment of the NFC connection in step T48, the MFP 10 transmits the own MAC address "M10" and information "NG" to the mobile terminal 200 through the NFC connection. The information "NG" may indicate that the MFP 10 is not allowed to establish a Wi-Fi® connection with an external device with being triggered by establishment of an NFC connection with the external device.

In step T52, the MFP 10 accepts input to the OK button on the standby screen by the user of the mobile terminal 100. In response, in step T54, the MFP 10 executes a G/O negotiation with the mobile terminal 100. Processing executed in each of steps T54 to T58 is the same or similar to the processing executed in each of steps T18 to T22, respectively, included in case X1. As described above, where the MFP 10 receives a G/O negotiation request from the mobile terminal 100 prior to establishment of an NFC connection with the mobile terminal 200, the MFP 10 establishes a Wi-Fi® connection with the mobile terminal 100 that transmitted the G/O negotiation request received by the MFP 10 prior to the establishment of the NFC connection.

Figure 3:
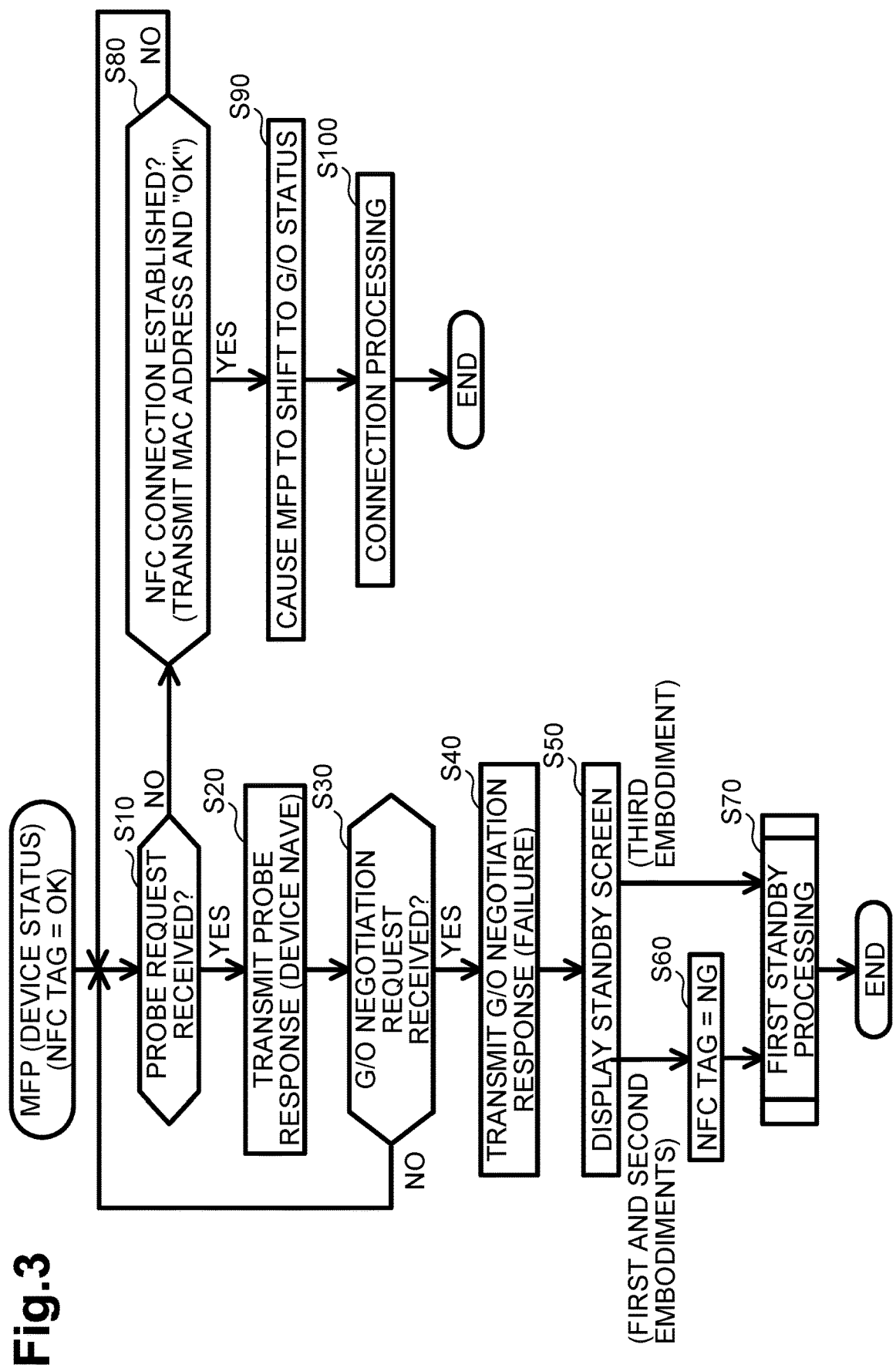
FIG. 3 is a flowchart of operations executed by the multifunction peripheral having the device status in the first embodiment according to one or more aspects of the disclosure.
Figure 4:
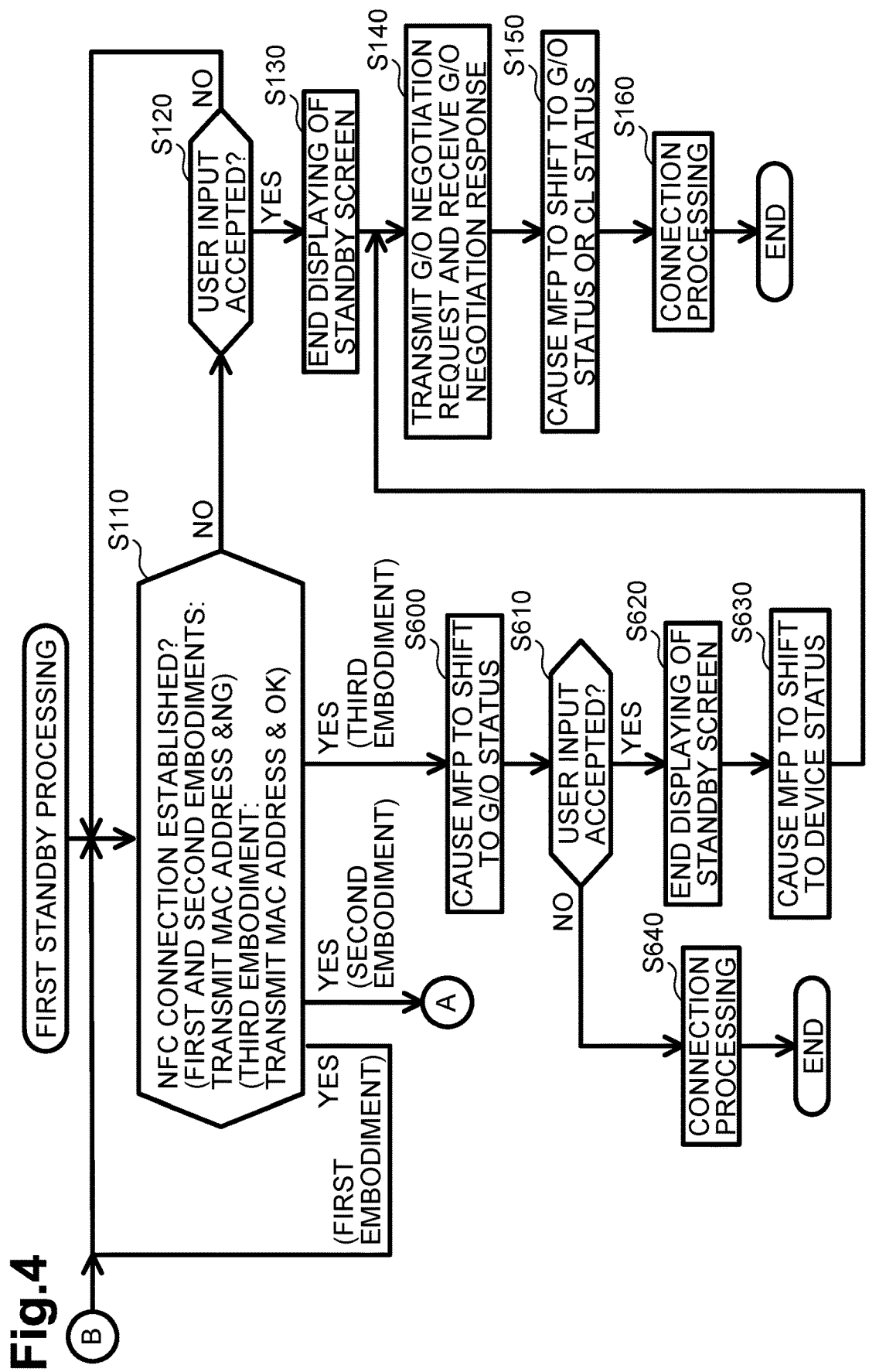
FIG. 4 is a flowchart of a first standby processing in the first embodiment according to one or more aspects of the disclosure.

Processing to be Executed by MFP 10 Having Device Status; FIGS. 3 and 4

Hereinafter, referring to FIGS. 3 and 4, an explanation will be provided on processing to be executed by the CPU 32 of the MFP 10 having the device status in accordance with the program 36. Cases X1, X2, and X3 (refer to FIG. 2) are each implemented by the processing illustrated in FIGS. 3 and 4.

When the MFP 10 is in a status where a WFD function is disabled (hereinafter, referred to as the "WFD-function disenabled status") (i.e., when the MFP 10 is in none of the G/O status, the CL status, and the device status), in response to acceptance of input of an operation for enabling the WFD function on the operation interface 12, the MFP 10 starts operating in the device status. When the MFP 10 operates in the WFD-function disenabled status, the CPU 32 is not allowed to execute processing for establishing a Wi-Fi® connection that complies with the WFD protocol (e.g., processing of step S10). When the MFP 10 operates in the device status, the CPU 32 is allowed to execute the processing for establishing a Wi-Fi® connection that complies with the WFD protocol. Where the MFP 10 shifts to the device status from the WFD-function disenabled status, the CPU 32 stores the MAC address "M10" and the information "OK" in a memory (not illustrated) of the NFC I/F 22.

In step S10, the CPU 32 monitors receipt of a Probe request from a mobile terminal (e.g., the mobile terminal 100) via the Wi-Fi® I/F 20. The Probe request is a signal broadcasted by a mobile terminal (i.e., a signal whose destination is not specified) in order to search one or more devices targeted for establishment of a Wi-Fi® connection with the mobile terminal. In step S20, in response to receipt of a Probe request (e.g., YES in step S10), the MFP 10 transmits a Probe response including the MAC address "M10" and the device name "D10" to the mobile terminal via the Wi-Fi® I/F 20. Hereinafter, the mobile terminal that is the sender of the Probe request in step S10 is referred to as the "first mobile terminal".

In step S30, the CPU 32 monitors receipt of a G/O negotiation request from the first mobile terminal via the Wi-Fi® I/F 20. The G/O negotiation request is a signal for requesting the MFP 10 to establish a Wi-Fi® connection. More specifically, the G/O negotiation request is a signal for requesting the MFP 10 to execute communication called G/O negotiation. The G/O negotiation is communication for determining which one of the MFP 10 and the first mobile terminal should operate as a master station (i.e., a G/O). In step S40, in response to receipt of a G/O negotiation request (e.g., YES in step S30 (refer to step T12 or T42 in FIG. 2)), the CPU 32 transmits a G/O negotiation response to the first mobile terminal via the Wi-Fi® I/F 20. The G/O negotiation response transmitted in step S40 includes information "Failure" indicating that a G/O negotiation is not allowed to be executed. Thus, at this moment, determination for determining in which status, the G/O or CL, the MFP 10 should operate is not executed.

In step S50, the CPU 32 displays the standby screen on the display 14 (refer to step T14 or T44 in FIG. 2). The standby screen is for waiting for input of a user operation for establishing a Wi-Fi® connection with the first mobile terminal. More specifically, for example, the standby screen includes the OK button and a message prompting the user to determine whether to allow the MFP 10 to establish a Wi-Fi® connection with the first mobile terminal.

In step S60, the CPU 32 overwrites the existing information "OK" with the information "NG" in the memory of the NFC I/F 22. In step S70, the CPU 32 executes first standby processing (refer to FIG. 4).

In step S80, while the CPU 32 monitors receipt of a Probe request from the first mobile terminal in step S10, the CPU 32 monitors establishment of an NFC connection with another mobile terminal (e.g., the mobile terminal 200) via the NFC I/F 22. When a user brings a mobile terminal close to the MFP 10, a distance between an NFC I/F of the mobile terminal and the NFC I/F 22 of the MFP 10 becomes less than the maximum distance for establishing an NFC connection (e.g., 10 cm). Thus, an NFC connection is established between the MFP 10 and the mobile terminal (refer to step T32 in FIG. 2). If the CPU 32 determines that information indicating that an NFC connection has been established has been received from the NFC I/F 22 (e.g., YES in step S80), the routine proceeds to step S90. Hereinafter, the mobile terminal with which the MFP 10 establishes the NFC connection in step S80 is referred to as the "second mobile terminal". The NFC I/F 22 transmits the MAC address "M10" and the information "OK" stored in the memory of the NFC I/F 22 to the second mobile terminal through the NFC connection (refer to step T34 in FIG. 2). Thus, the MFP 10 may notify the second mobile terminal that the second mobile terminal is allowed establish a Wi-Fi® connection with the MFP 10 having the MAC address "M10" with being triggered by establishment of the NFC connection therebetween.

In step S90, the CPU 32 causes the MFP 10 to shift from the device status to the G/O status (refer to step T36 in FIG. 2). At that time, the CPU 32 generates a Service Set identifier ("SSID") and a password. The SSID is an identifier for identifying a WFDNW in which the MFP 10 operates as a G/O. The password is to be used in authentication and encryption in the WFDNW.

In step S100, the CPU 32 executes connection processing for establishing a connection with the second mobile terminal via the Wi-Fi® I/F 20. More specifically, in response to receipt of a Probe request broadcasted by the second mobile terminal, the CPU 32 transmits a Probe response including the MAC address "M10" and the generated SSID to the second mobile terminal. The MAC address "M10" has been transmitted to the second mobile terminal in step S80. Therefore, transmission of a Probe response including the MAC address "M10" to the second mobile terminal enables the second mobile terminal to be notified of existence of the MFP 10 which is a connection target. In response to receipt of a Provision Discovery request from the second mobile terminal, the CPU 32 transmits a Provision Discovery response to the second mobile terminal. The Provision Discovery request is a signal for requesting establishment of a Wi-Fi® connection. In response to receipt of a Probe request from the second mobile terminal, the CPU 32 transmits a Probe response including the generated SSID and information "Device Password ID=0x0004" to the second mobile terminal. The Probe request includes the SSID transmitted to the second mobile terminal through the NFC connection established in step S80. The Probe request is a signal unicasted by the second mobile terminal (i.e., a signal whose destination is specified) in order to request a specific device (e.g., the MFP 10) to establish a Wi-Fi® connection therebetween. The information "Device Password ID=0x0004" may indicate that Wi-Fi® connection processing using the WPS is allowed to be executed. Thus, the MFP 10 may notify the second mobile terminal that the second mobile terminal is allowed to establish a Wi-Fi® connection with the MFP 10. Thereafter, the CPU 32 transmits the SSID and the password to the second mobile terminal in Wi-Fi Simple Configuration ("WSC") Exchange which is communication that complies with the PBC protocol of the WPS. The CPU 32 receives the SSID and the password from the second mobile terminal and authenticates the received SSID and password during communication such as Authentication, Association, and four-way handshake. As a result, the MFP 10 establishes a Wi-Fi® connection with the second mobile terminal and allows the second mobile terminal to participate as a slave station (i.e., a CL) in the WFDNW in which the MFP 10 operates as a master station (i.e., a G/O) (refer to step T38 in FIG. 2).

Hereinafter, referring to FIG. 4, the first standby processing of step S70 in FIG. 3 will be described. In step S110, the CPU 32 monitors establishment of an NFC connection with a mobile terminal (e.g., the mobile terminal 200) via the NFC I/F 22. If the CPU 32 determines that the MFP 10 has established an NFC connection with a mobile terminal via the NFC I/F 22 (e.g., YES in step S110 (refer to step T48 in FIG. 2)), the CPU 32 does not execute any processing. Hereinafter, the mobile terminal with which the MFP 10 has established an NFC connection in step S110 is referred to as the "third mobile terminal". The NFC I/F 22 transmits the MAC address "M10" and the information "NG" (refer to step S60 in FIG. 3) stored in the memory of the NFC I/F 22 to the third mobile terminal through the NFC connection established in step S110 (refer to step T50 in FIG. 3). Thus, the MFP 10 may notify the third mobile terminal that the third mobile terminal is not allowed establish a Wi-Fi® connection with the MFP 10 having the MAC address "M10" with being triggered by establishment of the NFC connection therebetween. With such notification, the third mobile terminal does not transmit a signal for establishing a Wi-Fi® connection (e.g., a Probe request) to the MFP 10, and therefore, a Wi-Fi® connection is not established between the MFP 10 and the third mobile terminal.

In step S120, while the CPU 32 monitors establishment of an NFC connection with the third mobile terminal in step S110, the CPU 32 monitors input to the OK button on the standby screen by the user of the first mobile terminal. In step S130, in response to acceptance of user input to the OK button (e.g., YES in step S120 (refer to step T16 or T52 in FIG. 2)), the CPU 32 ends the displaying of the standby screen.

In step S140, the CPU 32 transmits a G/O negotiation request to the first mobile terminal via the Wi-Fi® I/F 20, and receives a G/O negotiation response from the first mobile terminal via the Wi-Fi® I/F 20 (e.g., step T18 or T54 in FIG. 2). The G/O negotiation request includes an Intent value indicating an index of possibility that the MFP 10 becomes a G/O. The G/O negotiation response includes an Intent value indicating an index of possibility that the first mobile terminal becomes a G/O. The CPU 32 determines which one of the MFP 10 and the first mobile terminal should become a G/O by comparing the Intent values. As such a comparison, the CPU 32 determines that MFP 10 operates as one of the G/O and the CL. In step S150, the CPU 32 causes the MFP 10 to shift to the determined status, e.g., the G/O status or the CL status. In step S160, the CPU 32 executes connection processing for establishing a connection with the first mobile terminal via the Wi-Fi® I/F 20.

More specifically, Where the MFP 10 shifts to the G/O status in step S150 (refer to step T56 in FIG. 2), the CPU 32 generates an SSID and a password. Thereafter, in response to receipt of a Probe request including the MAC address "M10" of the MFP 10 from the first mobile terminal (e.g., a Probe request unicasted by the first mobile terminal), the CPU 32 transmits a Probe response including the generated SSID and information "Device Password ID=0x0004" to the first mobile terminal. Subsequently, similar to step S100 in FIG. 3, the CPU 32 executes communication such as WSC Exchange, Authentication, Association, and four-way handshake. As a result, the MFP 10 establishes a Wi-Fi® connection with the first mobile terminal and allows the first mobile terminal to participate as a slave station (i.e., a CL) in the WFDNW in which the MFP 10 operates as a master station (i.e., a G/O) (refer to step T58 in FIG. 2).

Where the MFP 10 shifts to the CL status in step S150, in response to transmission of a Probe request including the MAC address "M100" of the first mobile terminal to the first mobile terminal, the CPU 32 receives a Probe response including the SSID of the first mobile terminal and the information "Device Password ID=0x0004" from the first mobile terminal. The SSID is an identifier for identifying a WFDNW in which the first mobile terminal operates as a G/O and is generated by the first mobile terminal. Thereafter, the CPU 32 receives the SSID and the password from the first mobile terminal in WSC Exchange. The CPU 32 transmits the SSID and the password to the first mobile terminal and allows the first mobile terminal to authenticate the SSID and the password during communication such as Authentication, Association, and four-way handshake. As a result, the MFP 10 establishes a Wi-Fi® connection with the first mobile terminal and is allowed to participate as a slave station (i.e., a CL) in the WFDNW in which the first mobile terminal operates as a master station (i.e., a G/O).

Figure 5:
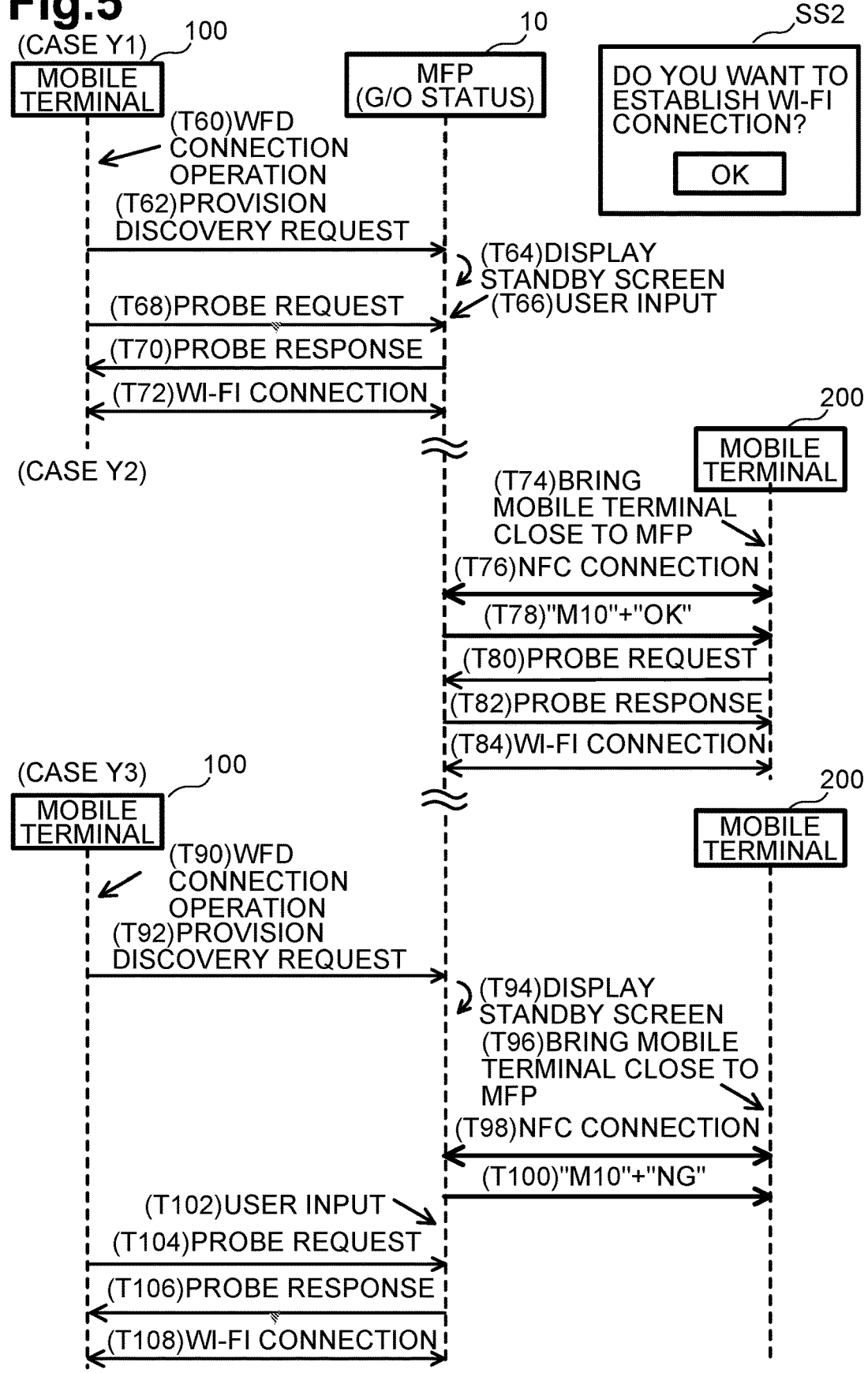
FIG. 5 is a sequence diagram representing interactions between a multifunction peripheral and mobile terminals in each of cases Y1, Y2, and Y3 which occur when the multifunction peripheral is in a Group Owner ("G/O") status in the first embodiment according to one or more aspects of the disclosure.

Referring to FIG. 5, example cases Y1, Y2, and Y3 will be described. Cases Y1, Y2, and Y3 occur sequentially when the MFP 10 operates in the G/O status. In each of cases Y1, Y2, and Y3, the MFP 10 establishes a wireless connection with one of the mobile terminals 100 and 200. Each of cases Y1, Y2, and Y3 helps understanding of processing illustrated in FIGS. 6 and 7. Therefore, actual processing may include one or more other processing that are not executed in cases Y1, Y2, and Y3.

In case Y1, where a WFD connection operation is performed on the operation interface 112 of the mobile terminal 100, a Wi-Fi® connection becomes established between the MFP 10 having the G/O status and the mobile terminal 100. In step T60, the mobile terminal 100 accepts a WFD connection operation performed the user of the mobile terminal 100. In response, in step T62, the mobile terminal 100 transmits a Provision Discovery request to the MFP 10.

In step T64, in response to receipt of the Provision Discovery request from the mobile terminal 100 in step T62, the MFP 10 displays the standby screen on the display 14. In step T66, the MFP 10 accepts input to the OK button on the standby screen by the user of the mobile terminal 100. In step T70, in response to receipt of a Probe request from the mobile terminal 100 in step T68, the MFP 10 transmits a Probe response to the mobile terminal 100. Thereafter, while maintaining the G/O status, the MFP 10 executes connection processing for establishing a connection with the mobile terminal 100, without executing G/O a negotiation. Thus, in step T72, the MFP 10 establishes a Wi-Fi® connection with the mobile terminal 100.

In case Y2, establishment of a Wi-Fi® connection between the MFP 10 and the mobile terminal 200 is triggered by establishment of an NFC connection therebetween. In step T74, the user brings the mobile terminal 200 close to the MFP 10. In response, in step T76, an NFC connection is established between the NFC I/F (not illustrated) of the mobile terminal 200 and the NFC I/F 22 of the MFP 10.

In step T78, in response to the establishment of the NFC connection in step T76, the MFP 10 transmits the own MAC address "M10" and the information "OK" to the mobile terminal 200 through the NFC connection. In step T82, in response to receipt of a Probe request from the mobile terminal 200 in step T80, the MFP 10 transmits a Probe response to the mobile terminal 200. Thereafter, while maintaining the G/O status, the MFP 10 executes connection processing for establishing a connection with the mobile terminal 200, without executing a G/O negotiation. Thus, in step T84, the MFP 10 establishes a Wi-Fi® connection with the mobile terminal 200.

In case Y3, while the standby screen is displayed on the MFP 10 in case Y1, an NFC connection becomes established between the MFP 10 and the mobile terminal 200. Processing executed in each of steps T90 to T94 is the same or similar to the processing executed in each of steps T60 to T64, respectively, included in case Y1. While the standby screen is displayed (i.e., prior to acceptance of user input to the OK button), in step T96, the user brings the mobile terminal 200 close to the MFP 10. In response, in step T98, an NFC connection is established between the NFC I/F (not illustrated) of the mobile terminal 200 and the NFC I/F 22 of the MFP 10.

In step T100, in response to the establishment of the NFC connection in step T98, the MFP 10 transmits the own MAC address "M10" and the information "NG" to the mobile terminal 200 through the NFC connection. In step T102, the MFP 10 accepts input to the OK button on the standby screen by the user of the mobile terminal 100. Processing executed in each of steps T104 to T108 is the same or similar to the processing executed in each of steps T68 to T72, respectively, described in case Y1. As described above, where the MFP 10 receives a Provision Discovery request from the mobile terminal 100 prior to establishment of an NFC connection with the mobile terminal 200, the MFP 10 establishes a Wi-Fi® connection with the mobile terminal 100 that transmitted the Provision Discovery request received by the MFP 10 prior to the establishment of the NFC connection.

Figure 6:
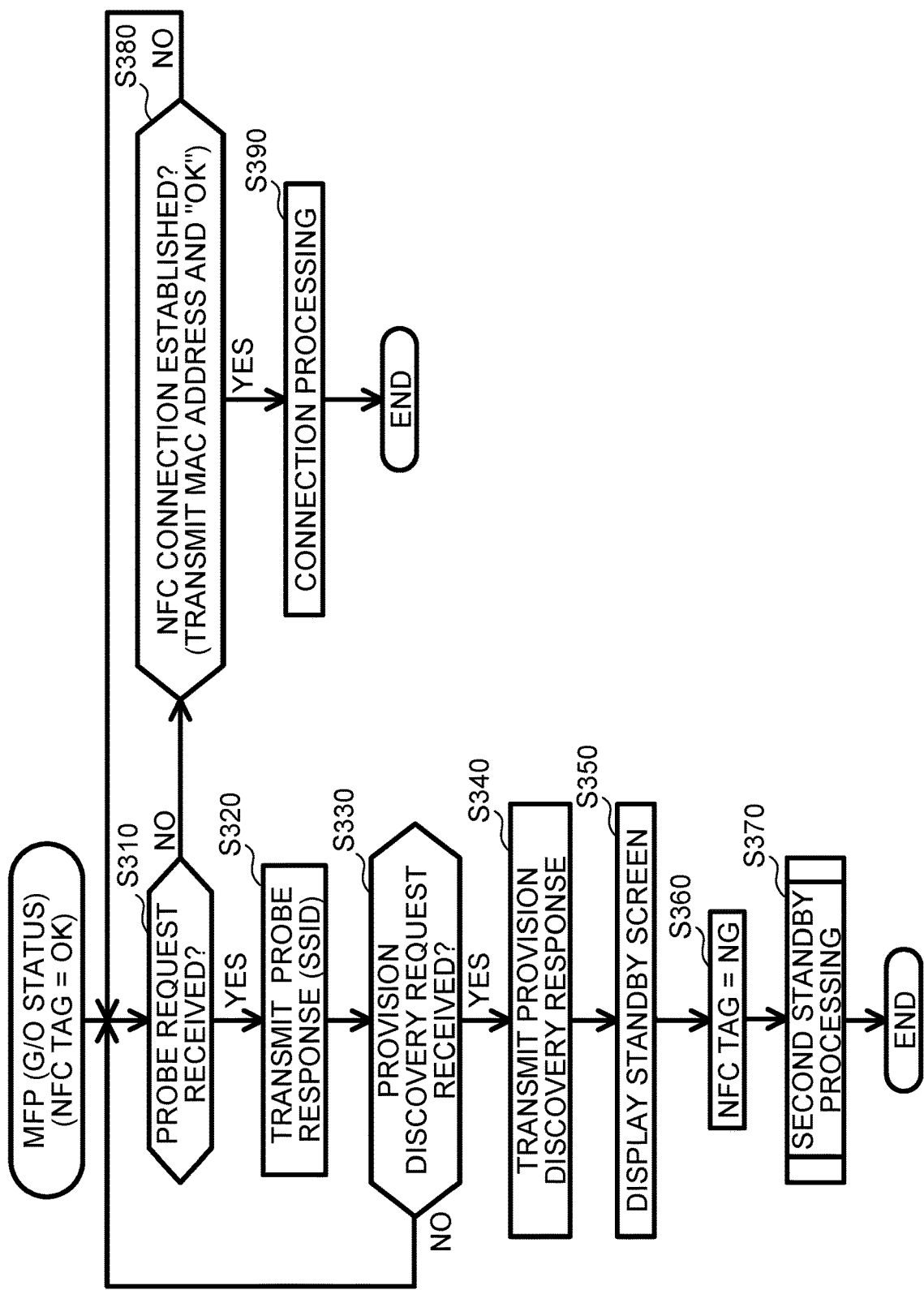
FIG. 6 is a flowchart of processing executed by the multifunction peripheral having the G/O status in the first embodiment according to one or more aspects of the disclosure.
Figure 7:
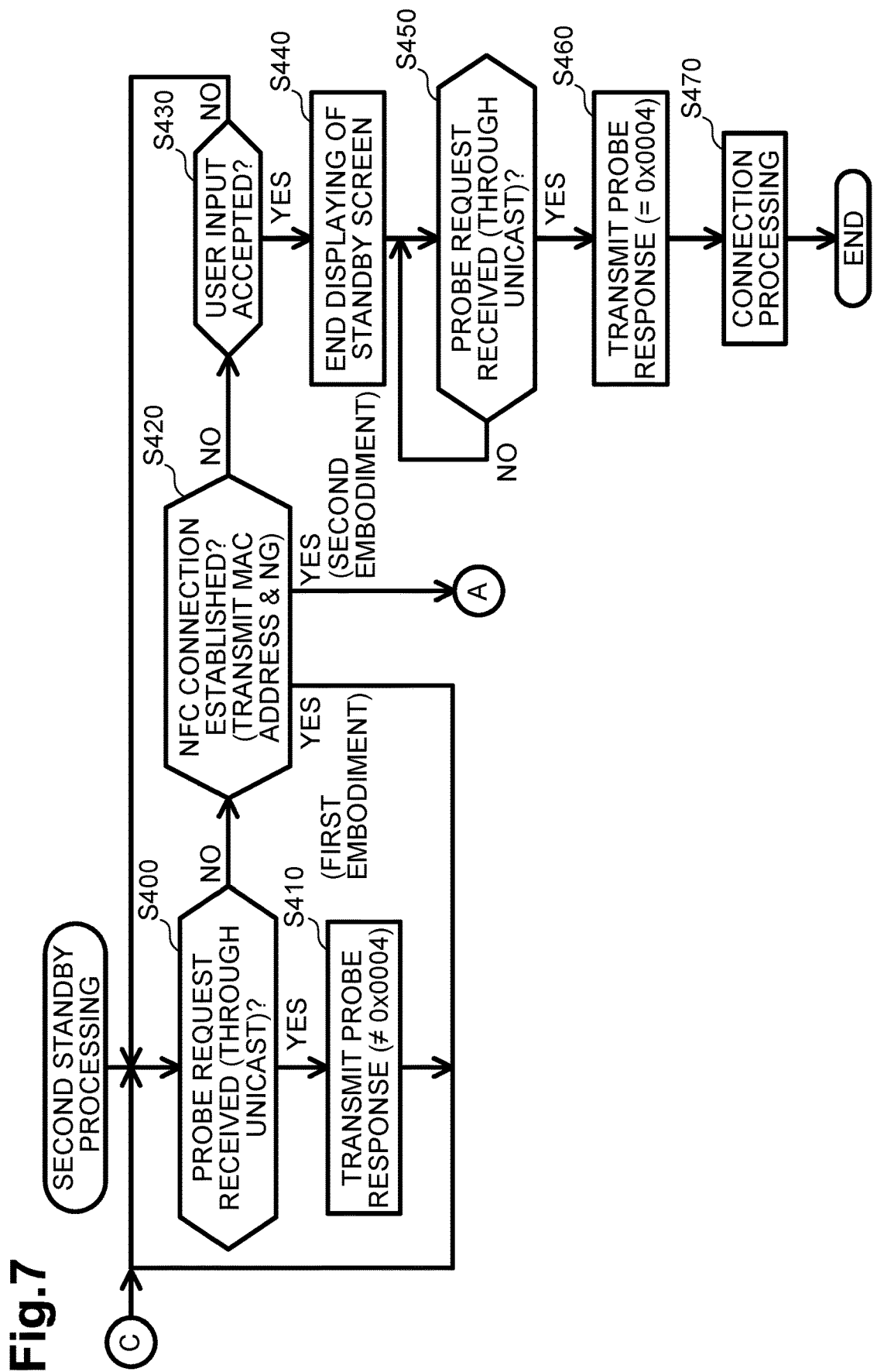
FIG. 7 is a flowchart of a second standby processing in the first embodiment according to one or more aspects of the disclosure.

Processing to be Executed by MFP 10 Having G/O Status; FIGS. 6 and 7

Hereinafter, referring to FIGS. 6 and 7, an explanation will be provided on processing to be executed by the CPU 32 of the MFP 10 having the G/O status in accordance with the program 36. Cases Y1, Y2, and Y3 (refer to FIG. 5) are implemented by the processing illustrated in FIGS. 6 and 7.

Where a user operation for causing the MFP 10 to shift to the G/O status is performed on the operation interface 12 while the MFP 10 operates in the device status, the MFP 10 shifts to the G/O status. At that time, the MFP 10 generates an SSID and a password to be used in the WFDNW in which the MFP 10 operates as a master station (e.g., a G/O).

Processing executed in step S310 is the same or similar to the processing executed in step S10 in FIG. 3. Processing executed in step S320 is similar to the processing executed in step S20 in FIG. 3. Nevertheless, although, in step S20 in FIG. 3, the MFP 10 transmits a Probe response including the device name "D1" to the first mobile terminal, in step S320, the MFP 10 transmits a Probe response including the SSID to the first mobile terminal.

In step S330, the CPU 32 monitors receipt of a Provision Discovery request from the first mobile terminal via the Wi-Fi® I/F 20. In step S340, in response to receipt of a Provision Discovery request (e.g., YES in step S330 (refer to step T62 or T92 in FIG. 5)), the CPU 32 transmits a Provision Discovery response to the first mobile terminal via the Wi-Fi® I/F 20. Processing executed in each of steps S350 and S360 is the same or similar to the processing executed in each of steps S50 and S60, respectively, in FIG. 3 (refer to step T64 or T94 in FIG. 5). In step S370, the CPU 32 executes second standby processing (refer to FIG. 7).

In step S380, while the CPU 32 monitors receipt of a Probe request from the first mobile terminal in step S310, the CPU 32 monitors establishment of an NFC connection with the second mobile terminal via the NFC I/F 22. Processing executed in each of steps S380 and S390 is the same or similar to the processing executed in each of steps S80 and S100, respectively, in FIG. 3. That is, the processing of step S90 in FIG. 3 is not executed in this routine. As a result, while maintaining the G/O status, the MFP 10 establishes a Wi-Fi® connection with the second mobile terminal and allows the second mobile terminal to participate as a slave station (i.e., a CL) in the WFDNW in which the MFP 10 operates as a master station (i.e., a G/O) (refer to steps T76 to T84 in FIG. 5).

Hereinafter, referring to FIG. 7, the second standby processing of step S370 in FIG. 6 will be described. In step S400, the CPU 32 monitors receipt of a Probe request unicasted by the first mobile terminal, i.e., the CPU 32 monitors receipt of a Probe request including the SSID transmitted in step S320 in FIG. 6 as the destination, via the Wi-Fi® I/F 20. In step S410, in response to the receipt of a Probe request (e.g., YES in step S400), the CPU 32 transmits a Probe response to the first mobile terminal via the Wi-Fi® I/F 20. At this moment, a user operation has not been performed on the standby screen displayed in step S350 in FIG. 6. Therefore, the Probe response received in step S410 does not include the information "Device Password ID=0×0004". Thus, the MFP 10 may notify the first mobile terminal that the first mobile terminal is not allowed to establish a Wi-Fi® connection with the MFP 10. Thus, connection processing using the WPS is not executed between the MFP 10 and the first mobile terminal.

Processing of step S420 is the same or similar to the processing of step S110 in FIG. 4. That is, if the CPU 32 determines that the MFP 10 has established an NFC connection with the third mobile terminal via the NFC I/F 22 (e.g., YES in step S420 (refer to step T98 in FIG. 5)), the CPU 32 does not execute any processing. Thus, a Wi-Fi® connection is not established between the MFP 10 and the third mobile terminal.

Processing executed in each of steps S430 and S440 is the same or similar to the processing executed in each of steps S120 and S130, respectively, in FIG. 4. Processing executed in each of steps S450 and S460 is similar to the processing executed in each of steps S400 and S410, respectively, in FIG. 7 (refer to steps T104 and T106 in FIG. 5). Nevertheless, although, in step S410, the MFP 10 transmits a Probe response not including the information "Device Password ID=0×0004", in step S460, the MFP 10 transmits a Probe response including the information "Device Password ID=0×0004". Thus, the MFP 10 may notify the first mobile terminal that the first mobile terminal is not allowed to establish a Wi-Fi® connection with the MFP 10. In step S470, while maintaining the G/O status, the CPU 32 executes connection processing for establishing a connection with the first mobile terminal (e.g., communication such as WSC Exchange, Authentication, Association, four-way handshake), without executing a G/O negotiation. The communication executed in step S470 is the same or similar to the communication executed in step S160 (refer to FIG. 4) where the MFP 10 shifts to the G/O status in step S150 (refer to FIG. 4). As a result, the MFP 10 establishes a Wi-Fi® connection with the first mobile terminal and allows the first mobile terminal to participate as a slave station (i.e., a CL) in the WFDNW in which the MFP 10 operates as a master station (i.e., a G/O) (refer to step T108 in FIG. 5).

Figure 8:
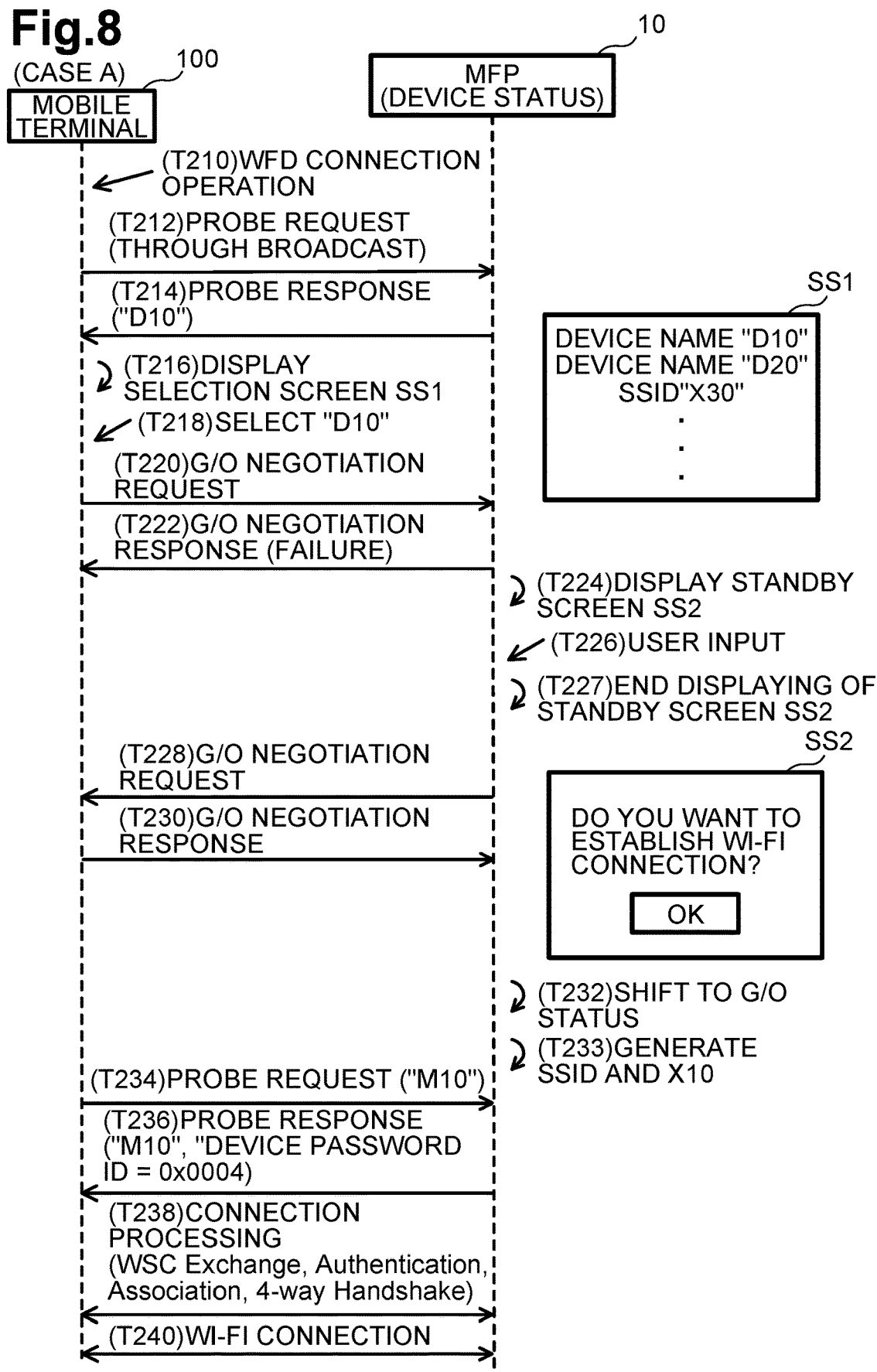
FIG. 8 is a sequence diagram representing interactions between the multifunction peripheral and one of the mobile terminals in case A in which a user input is received while a standby screen is displayed when the multifunction peripheral is in the device status in the first embodiment according to one or more aspects of the disclosure.
Figure 9:
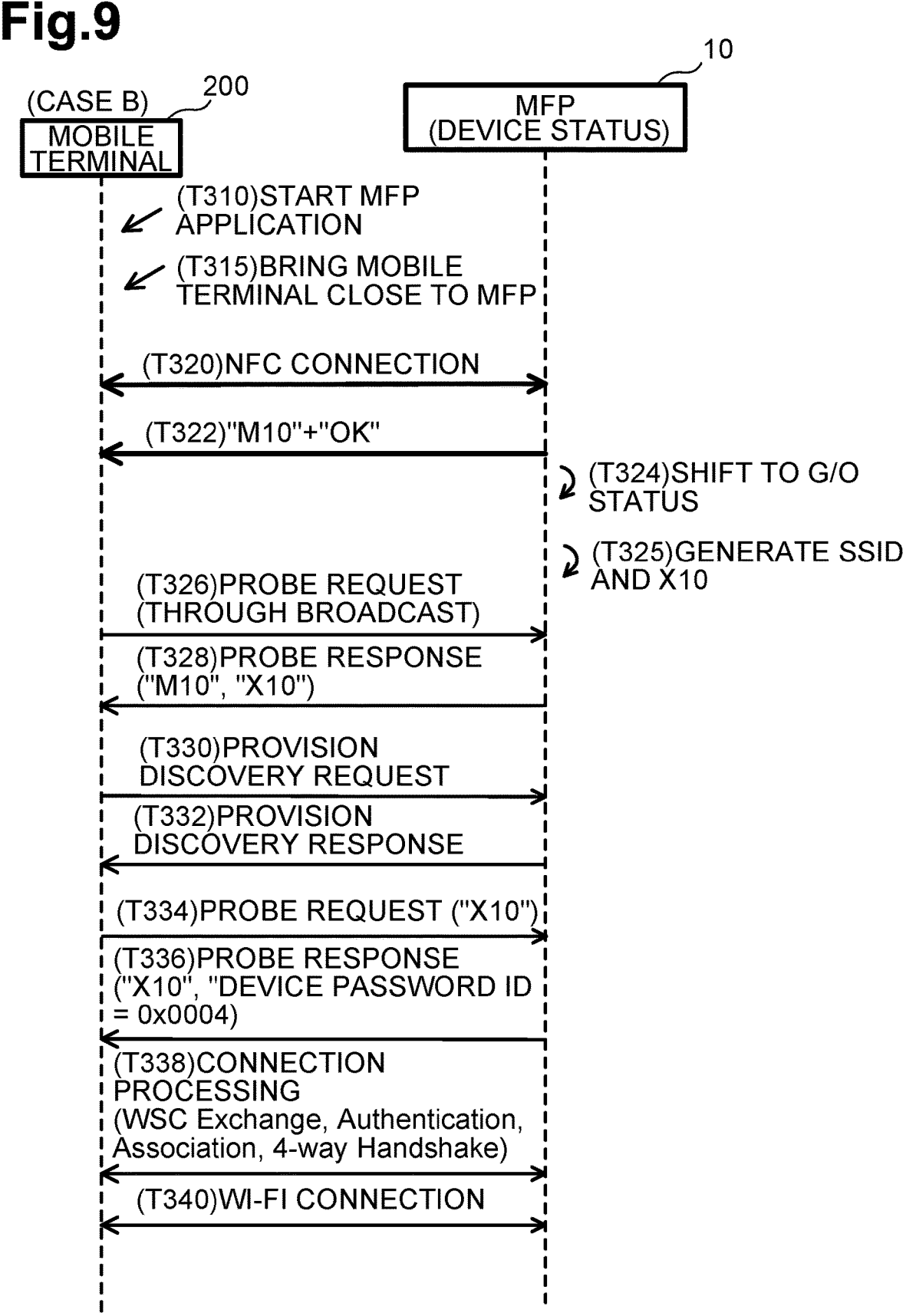
FIG. 9 is a sequence diagram representing interactions between the multifunction peripheral and another of the mobile terminals in case B in which an NFC connection is established when the multifunction peripheral is in the device status in the first embodiment according to one or more aspects of the disclosure.
Figure 10:
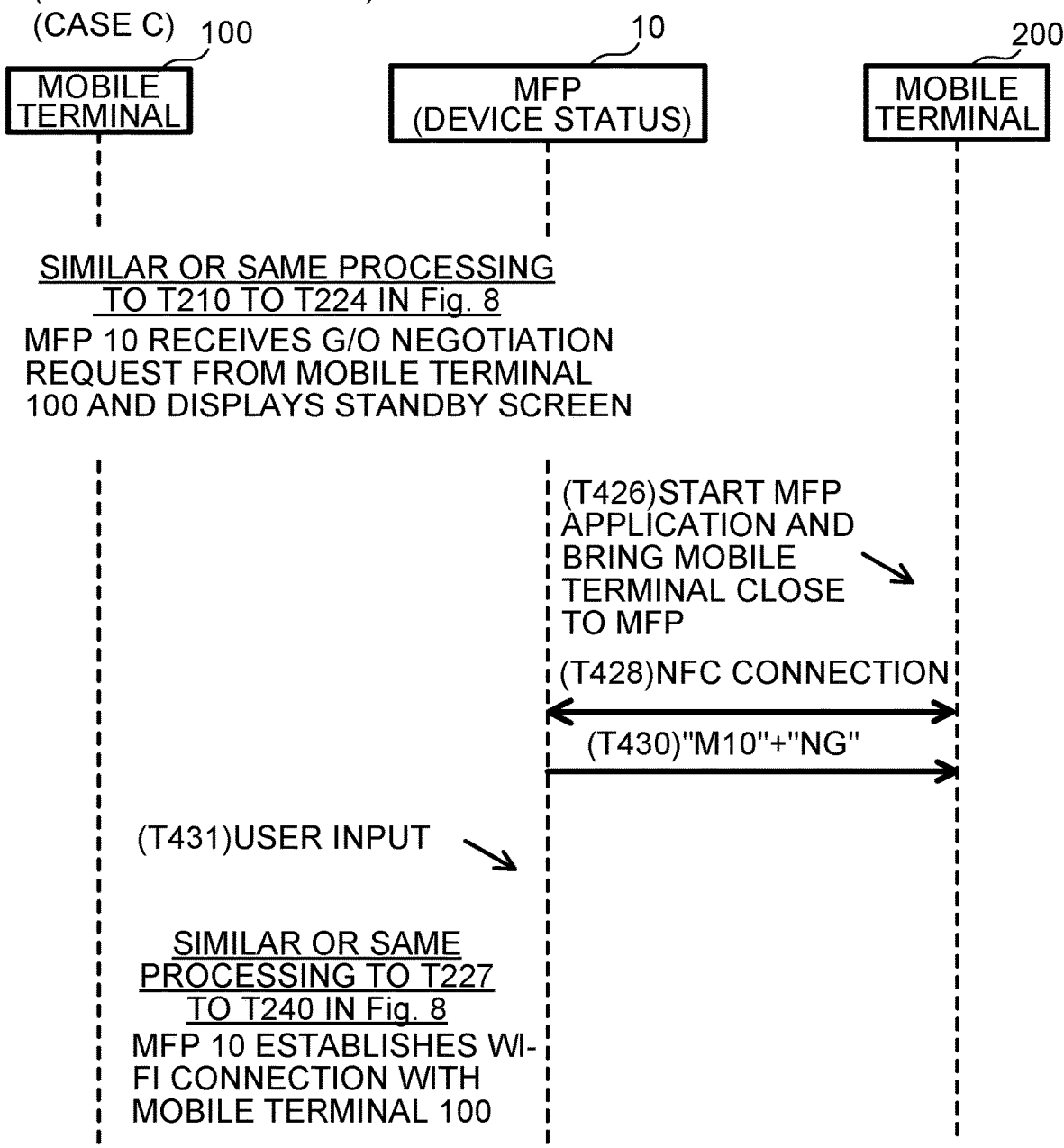
FIG. 10 is a sequence diagram representing interactions between the multifunction peripheral and the mobile terminals in case C in which an NFC connection is established when the multifunction peripheral is in the device status and the standby screen is displayed in the first embodiment according to one or more aspects of the disclosure.

Specific Example Cases Implemented When MFP 10 Is In Device Status; FIGS. 8, 9 and 10

Hereinafter, referring to FIGS. 8 to 10, an explanation will be provided on specific example cases to be implemented by the processing illustrated in FIGS. 3 and 4 when the MFP 10 is in the device status.

Case A; FIG. 8

In case A, where a WFD connection operation is executed on the operation interface 112 of the mobile terminal 100, a Wi-Fi® connection becomes established between the MFP 10 having the device status and the mobile terminal 100. In step T210, the mobile terminal 100 accepts a WFD connection operation performed on the operation interface 112 by the user of the mobile terminal 100. In response, in step T212, the mobile terminal 100 broadcasts a Probe request to one or more communication devices.

In step T214, in response to receipt of a Probe request from the mobile terminal 100 in step T212 (e.g., YES in step S10 in FIG. 3), the MFP 10 transmits a Probe response including the device name "D10" to the mobile terminal 100 (e.g., step S20).

In step T216, in response to receipt of the Probe response from the MFP 10 in step T214, the mobile terminal 100 displays, on the display 114, a selection screen SS1 including the device name "D10" included in the Probe response. The mobile terminal 100 may also receive one or more Probe responses from one or more other communication devices (not illustrated). Therefore, the selection screen SS1 may also include, for example, a device name "D20" of another communication device and an SSID "X30" of another wireless network configured by the another communication device. In step T218, the mobile terminal 100 accepts selection of the device name "D10" on the selection screen SS1. In such a case, in step T220, the mobile terminal 100 transmits, to the MFP 10, a G/O negotiation request including the Intent value of the mobile terminal 100.

In step T222, in response to receipt of the G/O negotiation request from the mobile terminal 100 in step T220 (e.g., YES in step S30), the MFP 10 transmits a G/O negotiation response including the information "Failure" to the mobile terminal 100 (e.g., step S40). In step T224, the MFP 10 displays a standby screen SS2 (e.g., step S50). In step T226, the MFP 10 accepts input to the OK button on the standby screen SS2 by the user of the mobile terminal 100 (e.g., YES in step S120 in FIG. 4). In response, in step T227, the MFP 10 ends the displaying of the standby screen SS2 (e.g., step S130). In such a case, in step T228, the MFP 10 transmits, to the mobile terminal 100, a G/O negotiation request including the Intent value of the MFP 10 (e.g., step S140).

In step T230, in response to receipt of a G/O negotiation request from the MFP 10 in step T228, the mobile terminal 100 transmits, to the MFP 10, a G/O negotiation response including the Intent value of the mobile terminal 100. Thus, a G/O negotiation is executed between the MFP 10 and the mobile terminal 100.

In case A, it is determined, as a result of the G/O negotiation, that the MFP 10 becomes a G/O. Therefore, in step T232, the MFP 10 shifts from the device status to the G/O status (e.g., step S150). In step T233, the MFP 10 also generates an SSID "X10" and a password (e.g., step S150).

In step T236, in response to receipt of a Probe request including the MAC address "M10" from the mobile terminal 100 in step T234, the MFP 10 transmits, to the mobile terminal 100, a Probe response including the SSID "X10" and the information "Device Password ID=0x0004" (e.g., step S160). In step T238, the MFP 10 executes connection processing for establishing a connection with the mobile terminal 100 (e.g., communication such as WSC Exchange, Authentication, Association, four-way handshake) (e.g., step S160). As a result, in step T240, the MFP 10 establishes a Wi-Fi® connection with the mobile terminal 100 and allows the mobile terminal 100 to participate as a CL in the WFDNW in which the MFP 10 operates as a G/O.

Case B; FIG. 9

In case B, establishment of a Wi-Fi® connection between the MFP 10 and the mobile terminal 200 is triggered by establishment of an NFC connection therebetween. In step T310, in response to acceptance of a user operation for starting the application 138, the mobile terminal 200 starts the application 138. In step T315, the user brings the mobile terminal 200 close to the MFP 10. In response, in step T320, an NFC connection is established between the NFC I/F (not illustrated) of the mobile terminal 200 and the NFC I/F 22 of the MFP 10.

In step T322, in response to the establishment of the NFC connection in step T320 (e.g., YES in step S80 in FIG. 3), the MFP 10 transmits the MAC address "M10" and the information "OK" to the mobile terminal 200 through the NFC connection. In step T324, the MFP 10 shifts from the device status to the G/O status (e.g., step S90). When the MFP 10 shifts to the G/O status, in step T325, the MFP 10 generates an SSID "X10" and a password.

In step T328, in response to receipt of a Probe request from the mobile terminal 200 in step T326, the MFP 10 transmits a Probe response including the MAC address "M10" and the SSID "X10" to the mobile terminal 200 (e.g., step S100).

The mobile terminal 200 has received the MAC address "M10" from the MFP 10 in the previous step (e.g., step T322). Therefore, even if the mobile terminal 200 receives two or more Probe responses from two or more communication devices including the MFP 10 in step T328, the mobile terminal 200 is enabled to identify the Probe response including the MAC address "M10" among the two or more Probe responses. Thus, the mobile terminal 200 may acquire the SSID "X10" included in the identified Probe response, i.e., the SSID "X10" of the WFDNW in which the mobile terminal 200 is to participate. That is, the mobile terminal 200 may recognize the MFP 10 having the G/O status. Thus, the mobile terminal 200 is enabled to execute subsequent processing for establishing a Wi-Fi® connection with the MFP 10.

In step T332, in response to receipt of a Provision Discovery request from the mobile terminal 200 in step T330, the MFP 10 transmits a Provision Discovery response to the mobile terminal 200 (e.g., step S100). Processing executed in each of steps T334 to T340 is the same or similar to the processing executed in each of steps T234 to T240, respectively, in FIG. 8. Nevertheless, the Probe request transmitted in step T334 is different from the Probe request transmitted in step T234 in FIG. 8. More specifically, for example, the Probe request transmitted in step T334 includes the SSID "X10" as the destination.

Case C; FIG. 10

In case C, while the standby screen SS2 is displayed on the MFP 10 in case A (refer to FIG. 8), an NFC connection becomes established between the MFP 10 and the mobile terminal 200. The MFP 10 executes processing that are the same or similar to the processing of steps T210 to T224 in FIG. 8. Thus, the MFP 10 displays the standby screen SS2 on the display 14. Processing executed in steps T426 and T428 are the same or similar to the processing executed in steps T310 to T320 in FIG. 9. In case C, while the standby screen SS2 is displayed on the MFP 10 (i.e., prior to acceptance of user input to the OK button), an NFC connection becomes established between the MFP 10 and the mobile terminal 200 in step T428. In such a case, in step T430, the MFP 10 transmits the MAC address "M10" and the information "NG" to the mobile terminal 200 through the NFC connection (e.g., YES in step S110 in FIG. 4).

In step T430, the mobile terminal 200 receives the information "NG" from the MFP 10. Thus, the mobile terminal 200 may be notified that the MFP 10 is displaying the standby screen SS2, i.e., that the MFP 10 is in a standby status in which the MFP 10 waits for establishment of a Wi-Fi® connection with another device. Therefore, the mobile terminal 200 does not execute processing for establishing Wi-Fi® execute processing for establishing Wi-Fi® connection with the MFP 10 (e.g., the mobile terminal 200 does not transmit a Probe request in step T326 in FIG. 9).

In step T431, the MFP 10 accepts input to the OK button on the standby screen SS2 by the user of the mobile terminal 100 (e.g., YES in step S120). Subsequent to step S120, the MFP 10 executes processing that are the same or similar processing to the processing executed in each of steps T227 to T240 in FIG. 8 (e.g., steps S130 to S160). As a result, the MFP 10 establishes a Wi-Fi® connection with the mobile terminal 100 and allows the mobile terminal 100 to participate as a CL in the WFDNW in which the MFP 10 operates as a G/O.

Figure 11:
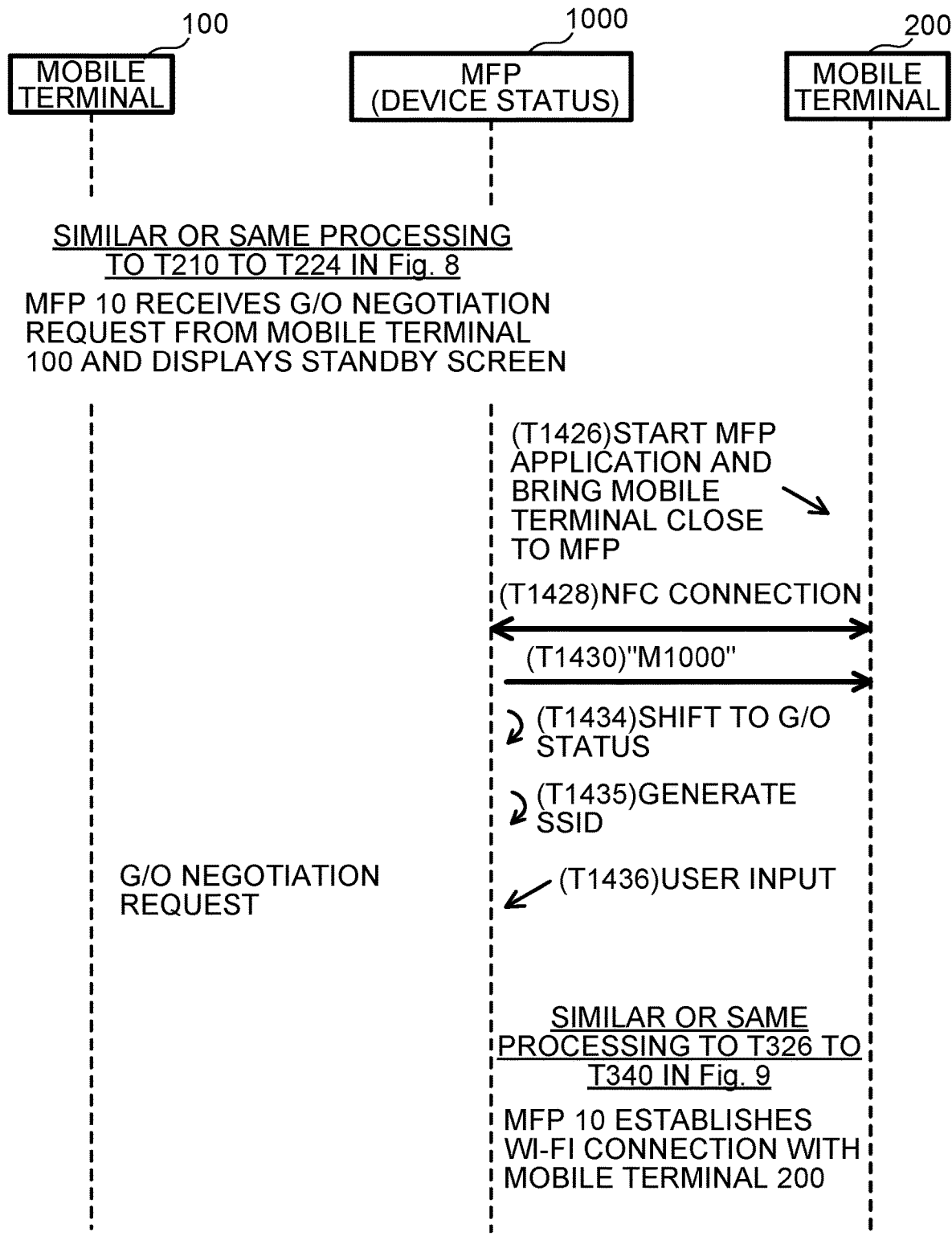
FIG. 11 is a sequence diagram representing interactions between the multifunction peripheral and the mobile terminals in a first comparative example.

First Comparative Example; FIG. 11

Hereinafter, referring to FIG. 11, a first comparative example will be described. In the first comparative example, an MFP 1000 fails in establishment of a Wi-Fi® connection with the mobile terminal 100. The MFP 1000 is assigned with a MAC address "M1000" and a device name "D1000".

The MFP 1000 executes processing that are the same or similar to the processing of steps T210 to T224 in FIG. 8. Nevertheless, a Probe response transmitted in step T214 includes the device name "D1000". In step T216, the selection screen including the device name "D1000" is displayed. In step T218, the device name "D1000" is selected. Processing executed in each of steps T1426 and T1428 is the same or similar to the processing executed in each of steps T426 and T428, respectively, in FIG. 10. In step T1430, the MFP 1000 transmits the MAC address "M1000" to the mobile terminal 200 through the established NFC connection. Nevertheless, in step T1430, the MFP 1000 does not transmit the information "NG" to the mobile terminal 200 together with the MAC address, which is different from the MFP 10 of the first embodiment. In step T1434, the MFP 1000 shifts from the device status to the G/O status. In step T1435, the MFP 1000 generates an SSID and a password. In the first comparative example, the MFP 1000 generates the SSID after shifting to the G/O status, which is different from the MFP 10 of the first embodiment.

In step T1436, the MFP 1000 accepts input to the OK button on the standby screen SS2 by the user of the mobile terminal 100. Nevertheless, because, in step T1434, the MFP 1000 has already shifted to the G/O status from the device status, the MFP 1000 is not allowed to execute a G/O negotiation. Therefore, the MFP 1000 is not allowed to transmit a G/O negotiation request (e.g., step S140 in FIG. 4) to the mobile terminal 100. That is, processing to be executed in step T228 and in its subsequent steps are not executed, and therefore, establishment of a Wi-Fi® connection fails between the MFP 1000 and the mobile terminal 100. Thereafter, the MFP 1000 executes processing that are the same or similar to the processing of steps T326 to T340 in FIG. 9 to establish a Wi-Fi® connection with the mobile terminal 200.

In contrast to the first comparative example, as illustrated in FIG. 10, in the first embodiment, where the MFP 10 establishes an NFC connection with the mobile terminal 200 while displaying the standby screen SS2 thereon (i.e., prior to acceptance of user input to the OK button), in step T430, the MFP 10 transmits the information "NG" to the mobile terminal 200 through the NFC connection and maintains the device status without shifting to the G/O status. Thus, the MFP 10 does not establish a Wi-Fi® connection with the mobile terminal 200. Then, in response to acceptance of user input to the OK button on the standby screen SS2 (e.g., step T431), the MFP 10 transmits a G/O negotiation request to the mobile terminal 100 (e.g., step T228 in FIG. 8) to establish a Wi-Fi® connection with the mobile terminal 100 (e.g., step T240 in FIG. 8). According to the first embodiment, if the MFP 10 establishes an NFC connection with the mobile terminal 200 while displaying the standby screen SS2 in response to receipt of a G/O negotiation request from the mobile terminal 100, the MFP 10 does not establish a Wi-Fi® connection with the mobile terminal 200. That is, where the MFP 10 receives a G/O negotiation request from the mobile terminal 100 prior to establishment of an NFC connection with the mobile terminal 200, the MFP 10 successfully establishes a Wi-Fi® connection with the mobile terminal 100 that transmitted the G/O negotiation request received by the MFP 10 prior to the establishment of the NFC connection.

Figure 12:
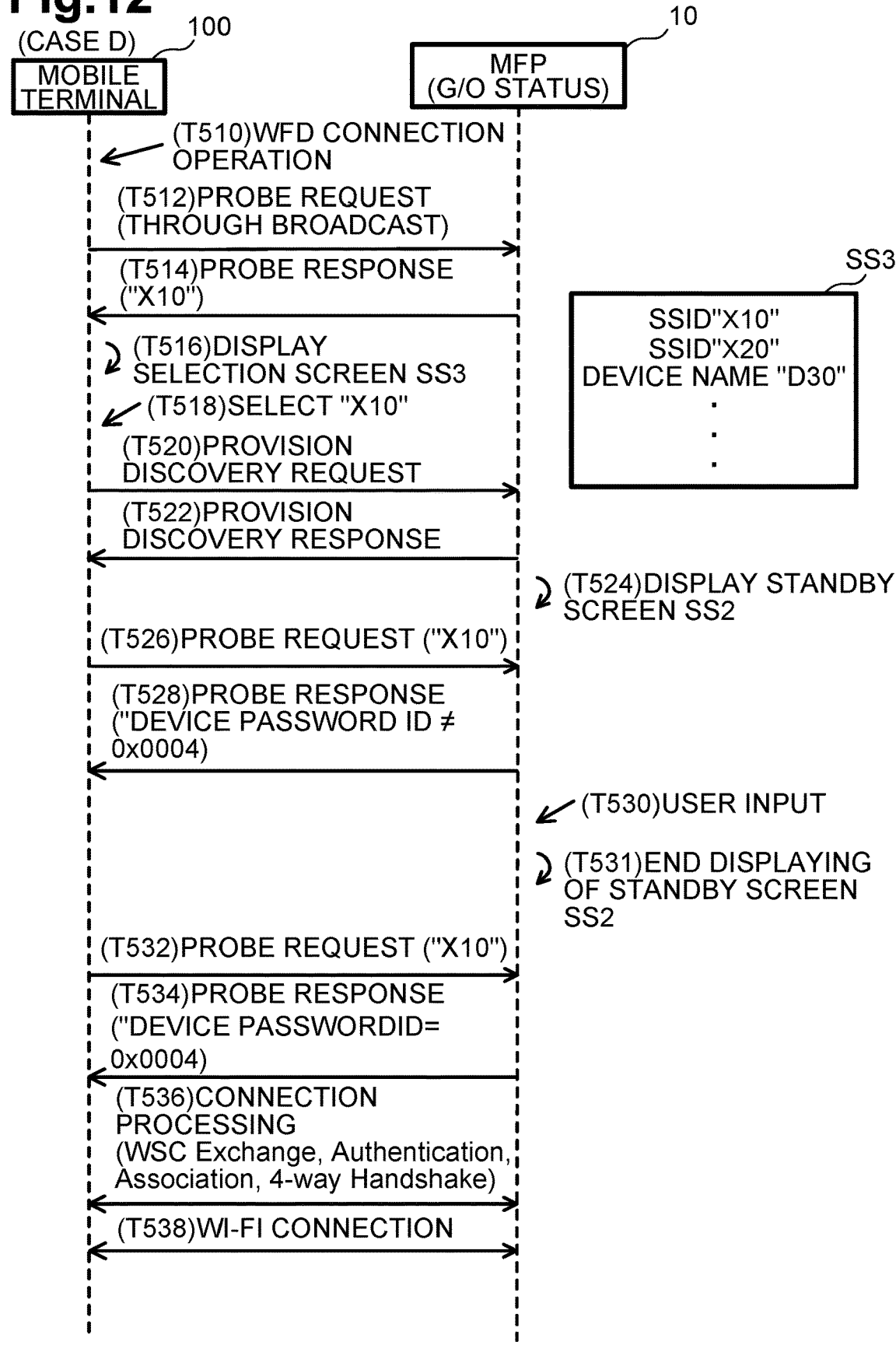
FIG. 12 is a sequence diagram representing interactions between the multifunction peripheral and the one of the mobile terminals in case D in which a user operation is performed on the standby screen when the multifunction peripheral is in the G/O status in the first embodiment according to one or more aspects of the disclosure.
Figure 13:
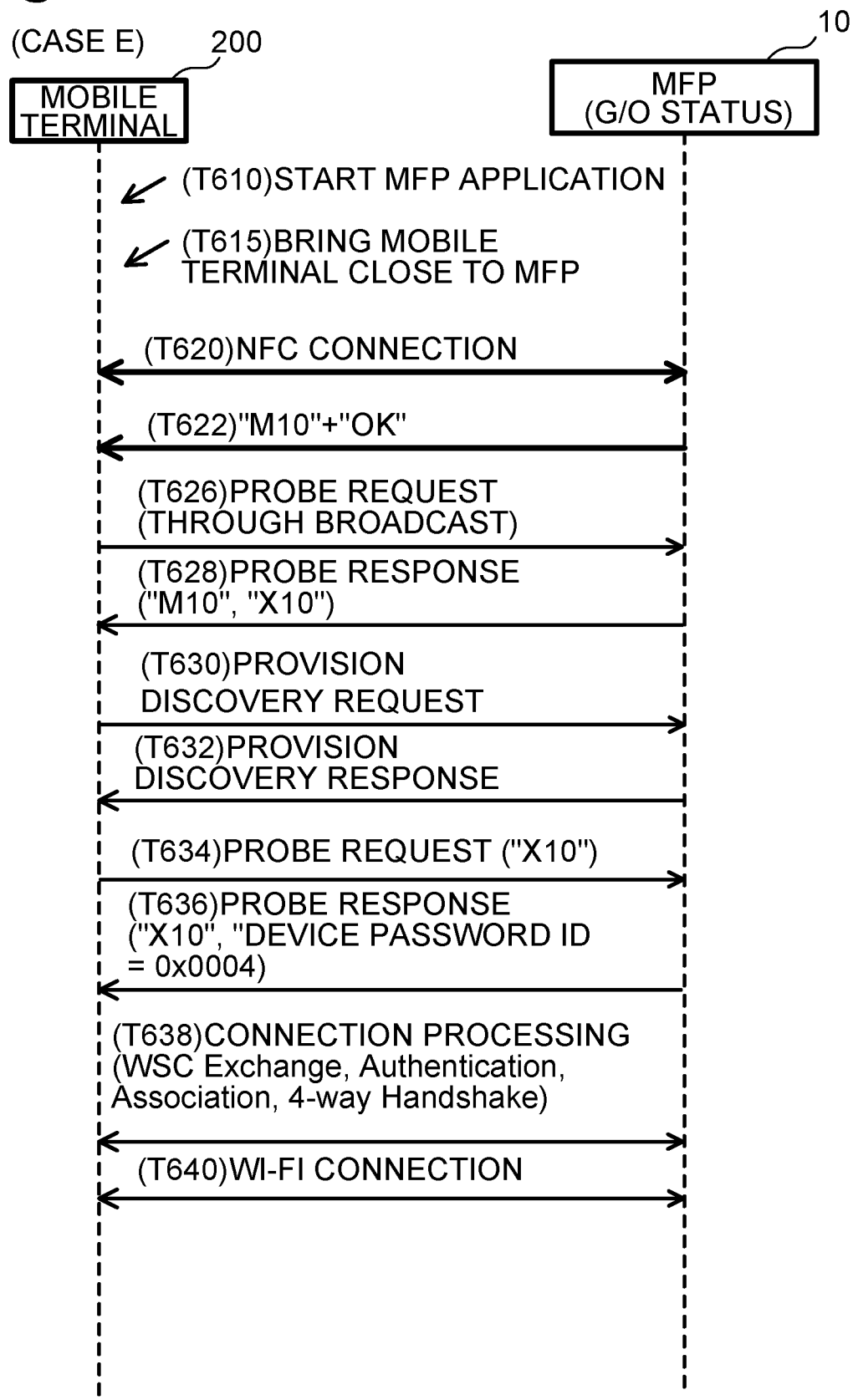
FIG. 13 is a sequence diagram representing interactions between the multifunction peripheral and the another of the mobile terminals in case E in which an NFC connection becomes established when the multifunction peripheral is in the G/O status in the first embodiment according to one or more aspects of the disclosure.
Figure 14:
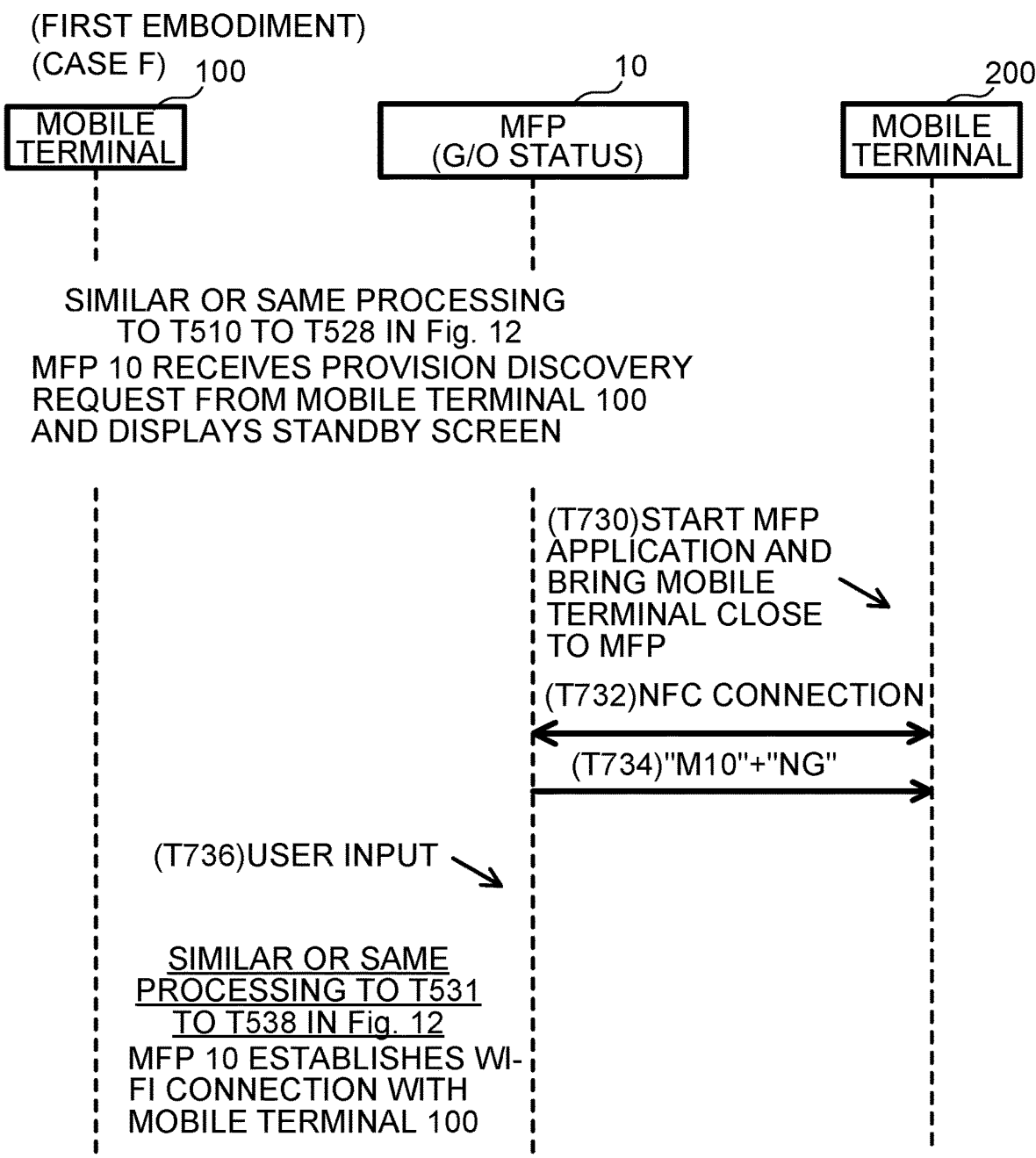
FIG. 14 is a sequence diagram representing interactions between the multifunction peripheral and the mobile terminals in case F in which an NFC connection becomes established when the multifunction peripheral is in the G/O status and the standby screen is being displayed in the first embodiment according to one or more aspects of the disclosure.

Specific Example Cases Implemented When MFP 10 Is In G/O Status; FIGS. 12 to 14

Hereinafter, referring to FIGS. 12 to 14, an explanation will be provided on other specific example cases to be implemented by the processing illustrated in FIGS. 6 and 7 when the MFP 10 is in the G/O status. In each of the specific example cases, the MFP 10 has already generated an SSID "X10" and a password when shifting to the G/O status.

Case D; FIG. 12

In case D, where a WFD connection operation is performed on the operation interface 112 of the mobile terminal 100, a Wi-Fi® connection becomes established between the MFP 10 having the G/O status and the mobile terminal 100.

Processing executed in each of steps T510 and T512 is the same or similar to the processing executed in each of steps T210 and T212, respectively, in FIG. 8. In step T514, in response to receipt of a Probe request from the mobile terminal 100 in step T512 (e.g., YES in step S310 in FIG. 6), the MFP 10 transmits a Probe response including the MAC address "M10" and the SSID "X10" to the mobile terminal 100 (e.g., step S320).

In step T516, in response to receipt of the Probe response from the MFP 10 in step T514, the mobile terminal 100 displays, on the display 114, a selection screen SS3 including the SSID "X10" included in the Probe response. In step T518, the mobile terminal 100 accepts selection of the SSID "X10" on the selection screen SS3. In such a case, in step T520, the mobile terminal 100 transmits a Probe Discovery request to the MFP 10.

In step T522, in response to receipt of the Provision Discovery request from the mobile terminal 100 in step T520 (e.g., YES in step S330), the MFP 10 transmits a Provision Discovery response to the mobile terminal 100 (e.g., step S340). In step T524, the MFP 10 displays the standby screen SS2 (refer to FIG. 8) (e.g., step S350).

In step T528, in response to receipt of the Probe request including the SSID "X10" as the destination in step T526 (e.g., YES in step S400 in FIG. 7), the MFP 10 transmits a Probe response to the mobile terminal 100 (e.g., step S410). At this moment, a user operation has not been performed on the standby screen SS2. Therefore, the Probe response does not includes the information "Device Password ID=0× 0004". Thus, connection processing using the WPS is not executed between the mobile terminal 100 and the MFP 10.

In step T530, the MFP 10 accepts input to the OK button on the standby screen SS2 by the user of the mobile terminal 100 (e.g., YES in step S430 in FIG. 4). In response, in step T531, the MFP 10 ends the displaying of the standby screen SS2 (e.g., step S440). In step T534, in response to receipt of the Probe request including the SSID "X10" from the mobile terminal 100 in step T532 (e.g., YES in step S450), the MFP 10 transmits a Probe response including the information "Device Password ID=0×0004" to the mobile terminal 100 (e.g., step S460). Thus, connection processing using the WPS is executed between the mobile terminal 100 and the MFP 10. Processing executed in each of steps T536 and T538 is the same or similar to the processing executed in each of steps T238 and T240, respectively, in FIG. 8 (e.g., step S470). As a result, the MFP 10 establishes a Wi-Fi® connection with the mobile terminal 100 and allows the mobile terminal 100 to participate as a CL in the WFDNW in which the MFP 10 operates as a G/O.

Case E; FIG. 13

In case E, establishment of a Wi-Fi® connection between the MFP 10 and the mobile terminal 200 is triggered by establishment of an NFC connection therebetween. Processing executed in case E is similar to the processing executed in case B illustrated in FIG. 9. Nevertheless, in case E, the MFP 10 is in the G/O status when case E begins, which is different from case B. More specifically, for example, processing executed in steps T610 to T640 in case E do not include the processing executed in steps T324 and T325 in FIG. 9 but include all of the other processing executed in steps T310 to T340 in FIG. 9.

Case F; FIG. 14

In case F, while the standby screen SS2 is displayed on the MFP 10 in case D (refer to FIG. 12), an NFC connection becomes established between the MFP 10 and the mobile terminal 200. The MFP 10 executes processing that are the same or similar to the processing of steps T510 to T528 in FIG. 12. Thus, the MFP 10 displays the standby screen SS2 on the display 14. Processing executed in steps T730 and T732 is the same or similar to the processing executed in steps T610 to T620 in FIG. 13. In case F, while the standby screen SS2 is displayed on the MFP 10 (i.e., prior to acceptance of user input to the OK button), an NFC connection becomes established between the MFP 10 and the mobile terminal 200 in step T732. In such a case, in step T734, the MFP 10 transmits the MAC address "M10" and the information "NG" to the mobile terminal 200 through the NFC connection (e.g., YES in step S420 in FIG. 7).

In step T734, the mobile terminal 200 receives the information "NG" from the MFP 10. Thus, the mobile terminal 200 may be notified that the MFP 10 is displaying the standby screen SS2, i.e., that the MFP 10 is in a standby status in which the MFP 10 waits for establishment of a Wi-Fi® connection with another device. Therefore, the mobile terminal 200 does not execute processing for establishing Wi-Fi® execute processing for establishing Wi-Fi® connection with the MFP 10 (e.g., the mobile terminal 200 does not transmit a Probe request in step T626 in FIG. 13).

In step T736, the MFP 10 accepts input to the OK button on the standby screen SS2 by the user of the mobile terminal 100 (e.g., YES in step S430). Subsequent to step S430, the MFP 10 executes processing that are the same or similar processing to the processing executed in each of steps T531 to T538 in FIG. 12 (e.g., steps S440 to S470). As a result, the MFP 10 establishes a Wi-Fi® connection with the mobile terminal 100 and allows the mobile terminal 100 to participate as a CL in the WFDNW in which the MFP 10 operates as a G/O.

Figure 15:
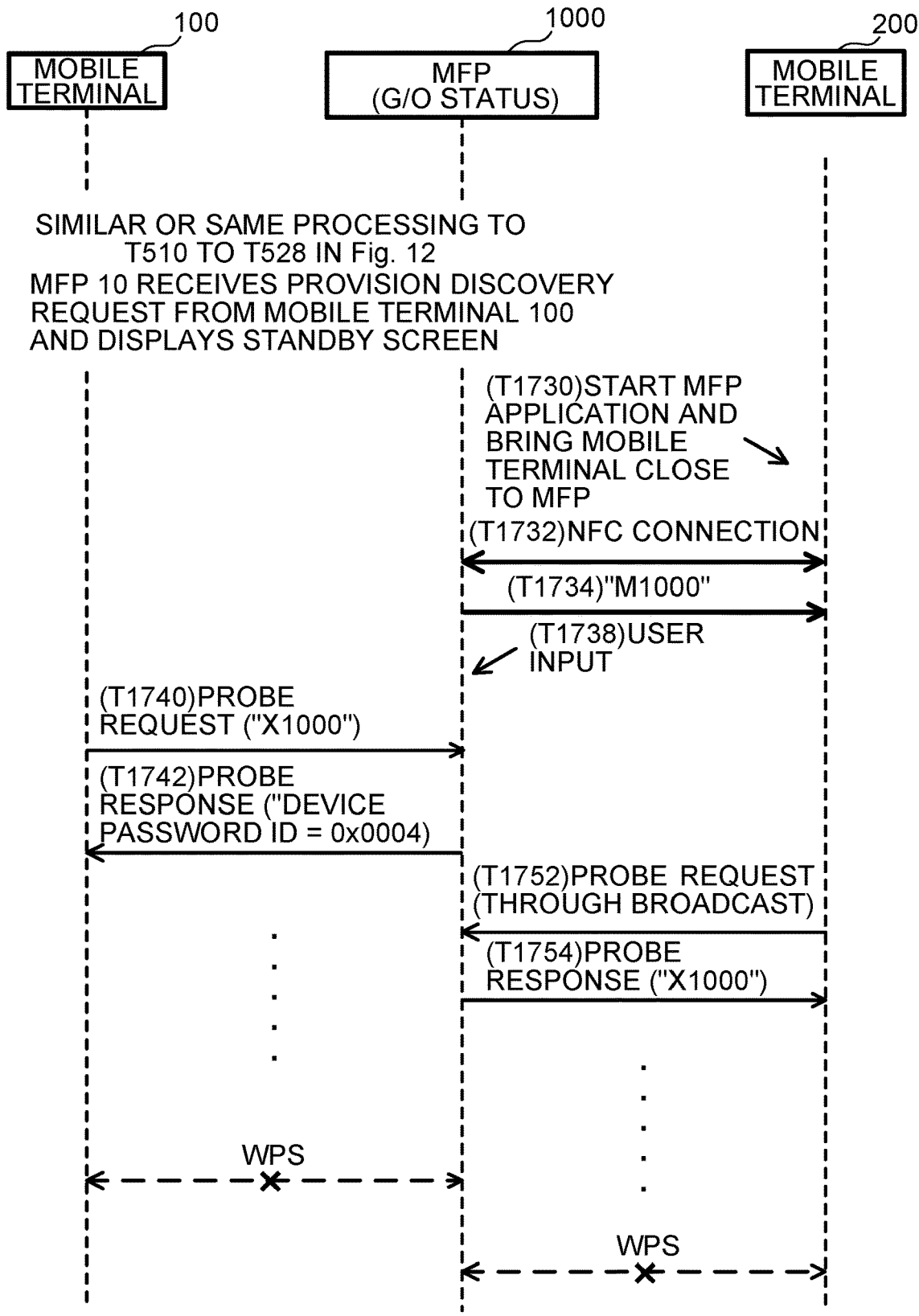
FIG. 15 is a sequence diagram representing interactions between the multifunction peripheral and the mobile terminals in a second comparative example.

Second Comparative Example; FIG. 15

Hereinafter, referring to FIG. 15, a second comparative example will be described. In the second comparative example, the MFP 1000 fails in establishment of a Wi-Fi® connection with the mobile terminal 100. The MFP 1000 has operated as a G/O and already generated the SSID "X1000".

The MFP 1000 executes processing that are the same or similar to the processing of steps T510 to T528 in FIG. 12. Nevertheless, a Probe response transmitted in step S514 includes the SSID "X1000". In step T516, the selection screen including the SSID "X1000" is displayed. In step T518, the SSID "X1000" is selected. Processing executed in each of steps T1730 and T1732 is the same or similar to the processing executed in each of steps T730 and T732, respectively, in FIG. 14. In step T1734, the MFP 1000 transmits the MAC address "M1000" to the mobile terminal 200 through the NFC connection. Nevertheless, in step T1734, the MFP 1000 does not transmit the information "NG" to the mobile terminal 200 together with the MAC address, which is different from the MFP 10 of the first embodiment. In step T1738, the MFP 10 accepts input to the OK button on the standby screen SS2 by the user of the mobile terminal 100. In such a case, in step T1742, in response to receipt of the Probe request including the SSID "X1000" from the mobile terminal 100 in step T1740, the MFP 1000 transmits a Probe response including the information "Device Password ID=0x0004" to the mobile terminal 100. Thereafter, the MFP 1000 executes processing that are the same or similar to the processing executed in each of steps T536 and T538 in FIG. 12 in order to establish a Wi-Fi® connection with the mobile terminal 100.

In step T1754, in response to receipt of the Probe request from the mobile terminal 200 in step T1752, the MFP 1000 transmits a Probe response including the SSID "X1000" to the mobile terminal 200. Thereafter, the MFP 1000 executes processing that are the same or similar to the processing executed in each of steps T630 to T640 in FIG. 13 in order to establish a Wi-Fi® connection with the mobile terminal 200.

Nevertheless, according to the Wi-Fi Alliance standards, if the MFP 1000 attempts to execute connection processing for establishing a connection with a device concurrently with another connection processing for establishing another connection with another device (i.e., attempts to establish connections with two or more devices concurrently), all of the attempted connection processing (i.e., communication using the WPS) are cancelled. Thus, in the MFP 1000, the connection processing for establishing a Wi-Fi® connection with the mobile terminal 100 and the connection processing for establishing a Wi-Fi® connection with the mobile terminal 200 are both cancelled. That is, the MFP 1000 is not allowed to establish a Wi-Fi® connection with either of the mobile terminals 100 and 200. If one of the processing executed in step T1740 and its subsequent steps (e.g., the communication with the mobile terminal 100) and the processing executed in step T1752 and its subsequent steps (e.g., the communication with the mobile terminal 200) is started prior to the other, if the other is started prior to the one, or if both are started at the same timing, both of the connection processing are cancelled according to the Wi-Fi Alliance standards.

In contrast to the second comparative example, as illustrated in FIG. 14, in the first embodiment, where the MFP 10 establishes an NFC connection with the mobile terminal 200 while displaying the standby screen SS2 thereon (i.e., prior to acceptance of user input to the OK button), in step T734, the MFP 10 transmits the information "NG" to the mobile terminal 200 through the NFC connection. Thus, connection processing for establishing a Wi-Fi® connection is not executed between the MFP 10 and the mobile terminal 200. That is, while the standby screen SS2 is displayed, the MFP 10 does not execute connection processing with the mobile terminal 200. This may therefore avoid cancellation of connection processing with the mobile terminal 100. Thus, in response to acceptance of user input to the OK button on the standby screen SS2 (refer to step T736), the MFP 10 transmits a Prove response including the information "Device Password ID=0x0004" in response to a Probe request transmitted from the mobile terminal 100 (e.g., step T534 in FIG. 12) to establish a Wi-Fi® connection with the mobile terminal 100 (e.g., step T538 in FIG. 12). According to the first embodiment, if, while displaying the standby screen SS2 in response to receipt of a Provision Discovery request from the mobile terminal 100, the MFP 10 establishes an NFC connection with the mobile terminal 200, the MFP 10 does not execute connection processing for establishing a Wi-Fi® connection with the mobile terminal 200, thereby avoiding cancellation of connection processing with the mobile terminal 100. As described above, where the MFP 10 receives a Provision Discovery request from the mobile terminal 100 prior to establishment of an NFC connection with the mobile terminal 200, the MFP 10 successfully establishes a Wi-Fi® connection with the mobile terminal 100 that transmitted the Provision Discovery request received by the MFP 10 prior to the establishment of the NFC connection.

The MFP 10 is an example of a "communication device". The mobile terminal 100 is an example of a "first external device". The mobile terminal 200 is an example of a "second external device". The NFC I/F 22 is an example of a "first wireless interface". The Wi-Fi® I/F 20 is an example of a "second wireless interface". The user of the mobile terminal 100 is an example of a "first user". The user of the mobile terminal 200 is an example of a "second user". Each of the G/O negotiation request and the Provision Discovery request is an example of a "connection request". The G/O negotiation request is an example of a "first-type connection request". The Provision Discovery request is an example of a "second-type connection request". The user input to the OK button on the standby screen SS2 is an example of an "accepting the instruction by the first user of the first external device". The Wi-Fi® connection established between the MFP 10 and the mobile terminal 100 is an example of a "wireless connection established with the first external device via the second wireless interface". The NFC connection established between the MFP 10 and the mobile terminal 200 is an example of "a connection with a second external device". The Wi-Fi® connection established between the MFP 10 and the mobile terminal 200 is an example of "a connection with the first external device". Each of the Probe request received in step S100 in FIG. 3 and the Probe request received in step S390 of FIG. 6 is an example of a "first signal". The information "OK" is an example of "first information". The information "NG" is an example of "second information". The G/O status is an example of a "master station status". The CL status is an example of a "slave station status". The device status is an example of a "specific status". The G/O negotiation is an example of "communication for determination". The case in which a positive determination (e.g., YES) is made in step S120 in FIG. 4 is an example of a "first case when the communication device is in the specific status". The case in which a positive determination (e.g., YES) is made in step S430 in FIG. 7 is an example of the "first case when the communication device is in the master station status". The case in which a positive determination (e.g., YES) is made in step S80 in FIG. 3 is an example of a "second case when the communication device is in the specific status". The case in which a positive determination (e.g., YES) is made in step S380 in FIG. 6 is an example of the "second case when the communication device is in the master station status". The case in which a positive determination (e.g., YES) is made in step S110 in FIG. 4 is an example of a "third case when the communication device is in the specific status". The case in which a positive determination (e.g., YES) is made in step S420 in FIG. 7 is an example of the "third case when the communication device is in the master station status". The interfaces may be hardware including an antenna and a CPU, such as the Wi-Fi® I/F 20 and the NFC I/F 22.

Second Embodiment

In the second embodiment, where an NFC connection becomes established between the MFP 10 and the third mobile terminal while the standby screen is displayed on the MFP 10 (i.e., prior to acceptance of user input to the OK button) (e.g., YES in step S110 in FIG. 4, or YES in step S420 in FIG. 7), the CPU 32 executes processing illustrated in FIG. 16.

Processing to be Executed by MFP 10; FIG. 16

As illustrated in FIG. 16, in step S500, the CPU 32 displays a selection screen SS4 on the display 14 instead of the standby screen. The selection screen SS4 enables the user of the third mobile terminal to determine whether to allow the MFP 10 to establish a Wi-Fi® connection with the third mobile terminal. More specifically, for example, the selection screen SS4 includes a message indicating that another device is waiting for establishment of a Wi-Fi® connection with the MFP 10, another message prompting the user to determine whether to allow the MFP 10 to establish a Wi-Fi® connection with the third mobile terminal, a YES button, and a NO button.

In step S510, the CPU 32 determines which one of the YES button and the NO button has accepted input by the user of the third mobile terminal.

In step S520, in response to acceptance of user input to the YES button (e.g., YES in step S510), the CPU 32 overwrites the existing information "NG" with the information "OK" in the memory of the NFC I/F 22.

In step S530, the CPU 32 monitors establishment of an NFC connection again with the third mobile terminal via the NFC I/F 22. In response to establishment of an NFC connection with the third mobile terminal (e.g., YES in step S530), the routine proceeds to step S540. In step S530, the NFC I/F 22 transmits the MAC address "M10" and the information "OK" stored in the memory of the NFC I/F 22 to the third mobile terminal through the NFC connection. Thus, the MFP 10 may notify the second mobile terminal that the third mobile terminal is allowed establish a Wi-Fi® connection with the MFP 10 having the MAC address "M10" with being triggered by establishment of the NFC connection therebetween.

In step S540, the CPU 32 causes the MFP 10 to shift from the device status to the G/O status. In step S540, the CPU 32 also generates an SSID and a password. Where the routine has passed through step S110 and a positive determination (e.g., YES) was made in step S110 (refer to FIG. 4), the CPU 32 executes processing of step S540. Nevertheless, where the routine has passed through step S420 and a positive determination (e.g., YES) has been made in step S420 (refer to FIG. 7), the CPU 32 does not execute the processing of step S540 because the MFP 10 has already operated as the G/O status. In step S550, the CPU 32 executes connection processing for establishing a connection with the third mobile terminal via the Wi-Fi® I/F 20. Processing executed in step S550 is the same or similar to the processing executed in step S100 in FIG. 3.

In step S560, in response to acceptance of user input to the NO button (e.g., NO in step S510), the CPU 32 displays the standby screen on the display 14 again instead of the selection screen SS4. Where the routine has passed through step S110 and a positive determination (e.g., YES) has been made in step S110 (refer to FIG. 4), the routine returns to the monitoring processing (e.g., steps S110 and S120) (refer to FIG. 4). Where the routine has passed through step S420 and a positive determination (e.g., YES) has been made in step S420 (refer to FIG. 7), the routine returns to the other monitoring processing (e.g., steps S400, S420, and S430) (refer to FIG. 7).

Case G: Specific Example Implemented When MFP 10 Is In Device Status; FIG. 17

Hereinafter, referring to FIG. 17, an explanation will be provided on a specific example case to be implemented when the MFP 10 is in the device status.

The MFP 10 executes the device processing that are the same or similar to the processing of steps T210 to T224 in FIG. 8. Thus, the MFP 10 displays the standby screen SS2 on the display 14. Processing executed in each of steps T826 to T829 is the same or similar to the processing executed in each of steps T426 to T430, respectively, in FIG. 10. In step T832, the MFP 10 displays the selection screen SS4 instead of the standby screen SS2 (e.g., step S500 in FIG. 16). In step T834, the CPU 32 determines which one of the YES button and the NO button of the selection screen SS4 has accepted input by the user of the mobile terminal 200 (e.g., step S510).

In step T836, in response to acceptance of user input to the NO button (e.g., NO in step S510) in step S834, the CPU 32 displays the standby screen SS2 on the display 14 again instead of the selection screen SS4 (e.g., step S560). In step T838, the MFP 10 accepts input to the OK button on the standby screen SS2 by the user of the mobile terminal 100 (e.g., YES in step S120 in FIG. 4). Subsequent to step T838, the MFP 10 executes processing that are the same or similar processing to the processing executed in each of steps T227 to T240 in FIG. 8. As a result, the MFP 10 establishes a Wi-Fi® connection with the mobile terminal 100 and allows the mobile terminal 100 to participate as a CL in the WFDNW in which the MFP 10 operates as a G/O.

In step T839, in response to acceptance of user input to the YES button on the selection screen SS4 (e.g., YES in step S510) in step T834, the MFP 10 establishes an NFC connection again with the mobile terminal 200 in response to re-approaching of the mobile terminal 200 to the MFP 10. In such a case, in step T842, the MFP 10 transmits the MAC address "M10" and the information "OK" to the mobile terminal 200 through the NFC connection (e.g., step S520 and YES in step S530). That is, while, in step T829, the MFP 10 transmits the information "NG" to the mobile terminal 200 to notify the mobile terminal 200 that the mobile terminal 200 is not allowed to establish a Wi-Fi® connection with the MFP 10, in step T842, the MFP 10 transmits the information "OK" to the mobile terminal 200 to notify the mobile terminal 200 that the mobile terminal 200 is allowed to establish a Wi-Fi® connection with the MFP 10. Thus, the MFP 10 may be enabled to execute connection processing for establishing a Wi-Fi® connection with the mobile terminal 200. That is, in step T844, the MFP 10 shifts to the G/O status (e.g., step S540). In step T846, the MFP 10 generates an SSID and a password. Subsequent to step T844, the MFP 10 executes processing that are the same or similar processing to the processing executed in each of steps T326 to T340 in FIG. 9 (e.g., step S550). As a result, the MFP 10 establishes a Wi-Fi® connection with the mobile terminal 200 and allows the mobile terminal 200 to participate as a CL in the WFDNW in which the MFP 10 operates as a G/O.

Case G: Specific Example Implemented When MFP 10 Is In G/O Status; FIG. 18

Hereinafter, referring to FIG. 18, an explanation will be provided on a specific example case to be implemented when the MFP 10 is in the G/O status.

The MFP 10 executes processing that are the same or similar to the processing of steps T510 to T528 in FIG. 12. Thus, the MFP 10 displays the standby screen SS2 on the display 14. Processing executed in each of steps T926 to T932 is the same or similar to the processing executed in each of steps T826 to T832, respectively, in FIG. 17.

In step T936, in response to acceptance of user input to the NO button (e.g., NO in step S510) in step S934, the MFP 10 executes processing of steps T936 and T938. Processing executed in each of steps T936 and T938 is the same or similar to the processing executed in each of steps T836 and T838, respectively, in FIG. 17. Subsequent to step T938, the MFP 10 executes processing that are the same or similar processing to the processing executed in each of steps T531 to T538 in FIG. 12. As a result, the MFP 10 establishes a Wi-Fi® connection with the mobile terminal 100 and allows the mobile terminal 100 to participate as a CL in the WFDNW in which the MFP 10 operates as a G/O.

In response to acceptance of user input to the YES button (e.g., YES in step S510) in step S934, the MFP 10 executes processing of steps T940 and T942. Processing executed in each of steps T940 and T942 is the same or similar to the processing executed in each of steps T840 and T842, respectively, in FIG. 17. Subsequent to step T942, the MFP 10 executes processing that are the same or similar processing to the processing executed in each of steps T626 to T640 in FIG. 13. As a result, the MFP 10 establishes a Wi-Fi® connection with the mobile terminal 200 and allows the mobile terminal 200 to participate as a CL in the WFDNW in which the MFP 10 operates as a G/O.

In the second embodiment, as described above, where an NFC connection becomes established between the MFP 10 and the mobile terminal 200 while the standby screen SS2 is displayed on the MFP 10 (i.e., prior to acceptance of user input to the OK button), the MFP 10 displays the selection screen SS4 instead of the standby screen SS2 (e.g., step T832 in FIG. 17 or step T932 in FIG. 18). Thus, the user of the mobile terminal 200 may be notified that another device (e.g., the mobile terminal 100) is waiting for establishment of a Wi-Fi® connection with the MFP 10. Where the user of the mobile terminal 200 does not allow the MFP 10 to establish a Wi-Fi® connection with the mobile terminal 200 (e.g., NO in step T834 in FIG. 17 or NO in step T934 in FIG. 18), the MFP 10 displays the standby screen SS2 again instead of the selection screen SS4 (e.g., step T836 in FIG. 17 or step T936 in FIG. 18). Therefore, the user of the mobile terminal 100 is allowed to operate the OK button on the standby screen SS2 (e.g., step T838 in FIG. 17 or step T938 in FIG. 18). In response to such an operation, the MFP 10 may be allowed to establish a Wi-Fi® connection with the mobile terminal 100. Where the user of the mobile terminal 200 allows the MFP 10 to establish a Wi-Fi® connection with the mobile terminal 200 (e.g., YES in step T834 in FIG. 17 or YES in step T934 in FIG. 18), the MFP 10 may be allowed to establish a Wi-Fi® connection with the mobile terminal 200 in response to reestablishment of an NFC connection with the mobile terminal 200. As described above, the MFP 10 may be allowed to establish a Wi-Fi® connection with one of the mobile terminals 100 and 200 in accordance with intention of the user of the mobile terminal 200.

Third Embodiment

In the third embodiment, the MFP 10 does not transmit the information "NG" through an NFC connection, which is different from the first and second embodiments.

Processing to be Executed by MFP 10; FIGS. 3 and 4

In the third embodiments, the processing of step S60 in FIG. 3 is not executed. Therefore, as illustrated in FIG. 4, in response to establishment of an NFC connection between the MFP 10 and the third mobile terminal (e.g., YES in step S110), the NFC I/F 22 transmits the MAC address "M10" and the information "OK" to the third mobile terminal through the NFC connection.

If, in step S110, the CPU 32 determines that an NFC connection has been established (e.g., YES in step S110), in step S600, the CPU 32 causes the MFP 10 to shift from the device status to the G/O status. In step S610, the CPU 32 monitors user input to the OK button on the standby screen. In step S620, in response to acceptance of user input to the OK button (e.g., YES in step S610), the CPU 32 ends the displaying of the standby screen. In step S630, the CPU 32 causes the MFP 10 to shift from the G/O status to the device status. Thereafter, processing of each of S140 to S160 is executed. Thus, the MFP 10 is allowed to establish a Wi-Fi® connection with the first mobile terminal.

If, in step S110, the CPU 32 determines that an NFC connection has not been established (e.g., NO in step S110) (i.e., if a user operation has not been performed on the OK button on the standby screen), in step S640, the CPU 32 causes the MFP 10 to establish a Wi-Fi® connection with the third mobile terminal. Processing executed in step S640 is the same or similar to the processing executed in step S100 in FIG. 3.

Case K: Specific Example Implemented When MFP 10 Is In Device Status; FIG. 19

Hereinafter, referring to FIG. 19, an explanation will be provided on a specific example case to be implemented when the MFP 10 is in the device status.

The MFP 10 executes processing that are the same or similar to the processing of steps T210 to T224 in FIG. 8. Thus, the MFP 10 displays the standby screen SS2 on the display 14. In step T1026, the user brings the mobile terminal 200 close to the MFP 10. In response, in step T1028, the MFP 10 establishes an NFC connection with the mobile terminal 200 (e.g., YES in step S110 in FIG. 4). In response, in step T1030, the MFP 10 transmits the MAC address "M10" and the information "OK" to the mobile terminal 200. Transmitting the information "OK" is different from the processing of step T430 in FIG. 10 according to the first embodiment. In response to receipt of the MAC address and the information "OK", the mobile terminal 200 executes connection processing for establishing a Wi-Fi® connection with the MFP 10. In step T1032, the MFP 10 shifts from the device status to the G/O status (e.g., step S600).

As described above, the connection processing for establishing a Wi-Fi® connection between the MFP 10 and the mobile terminal 200 (e.g., steps T326 to T340 in FIG. 9) is executed therebetween. Nevertheless, some time is required until a Wi-Fi® connection is established. In step T1034, the MFP 10 accepts user input to the OK button on the standby screen SS2 (e.g., YES in step S610) prior to completion of establishment of a Wi-Fi® connection with the mobile terminal 200. In response, in step T1036, the MFP 10 ends the displaying of the standby screen SS2 (e.g., step S620). In step T1038, the MFP 10 shifts from the G/O status to the device status (i.e., returns to the device status) (e.g., step S630). Thus, the connection processing for establishing a Wi-Fi® connection between the MFP 10 and the mobile terminal 200 is cancelled, and therefore, the MFP 1 does not establish a Wi-Fi® connection with the mobile terminal 200. Processing executed in each of steps T1422 and T1424 is the same or similar to the processing executed in each of steps T228 and S230, respectively, in FIG. 8. Subsequent to step T1424, the MFP 10 executes processing that are the same or similar processing to the processing executed in each of steps T232 to T240 in FIG. 8. As a result, the MFP 10 establishes a Wi-Fi® connection with the mobile terminal 100 and allows the mobile terminal 100 to participate as a CL in the WFDNW in which the MFP 10 operates as a G/O.

In the third embodiment, in response to establishment of an NFC connection with the mobile terminal 200 while the standby screen SS2 is displayed on the MFP 10, the MFP 10 shifts from the device status to the G/O status. Then, in response to acceptance of user input to the OK button on the standby screen SS2 prior to completion of establishment of Wi-Fi® connection with the mobile terminal 200, the MFP 10 returns to the device status from the G/O status. Thus, the MFP 10 does not establish a Wi-Fi® connection with the mobile terminal 200. Therefore, the MFP 10 is allowed to execute a G/O negotiation with the mobile terminal 100 to establish a Wi-Fi® connection with the mobile terminal 100 successfully.

While the embodiment of the present invention has been described in detail, this is merely an example and does not limit the scope of the appended claims. Technique disclosed in the scope of the claims includes various changes, arrangement and modifications of the embodiment. Hereinafter, example variations of the above-described embodiment will be described.

First Variation

The "standby screen" might not necessarily be configured to wait for input to the OK button (i.e., the "standby screen" might not necessarily be the standby screen for the PBC protocol of the WPS). For example, the "standby screen" may be a standby screen for PIN code system. In one example, where a PIN code displayed on the MFP 10 is entered to an operation interface of a mobile terminal, a screen for displaying the PIN code on the MFP 10 is another example of the "standby screen". In such a case, the user operation (i.e., entry of the PIN code) may be performed on the operation interface of the mobile terminal. That is, where the MFP 10 receives, from the mobile terminal, a specific signal including the entered PIN code displayed on the MFP 10, the MFP 10 executes the processing of steps S130 to S160 in FIG. 4, the processing of steps S440 to S470 in FIG. 7, and/or the processing of steps S620 to S630. In such a case, in steps S120, S430, and S610, the CPU 32 determines whether a specific signal has been received. The operation interface 112 of the mobile terminal 100 is another example of the "operation interface". In another example, where a PIN code displayed on the mobile terminal is entered to the MFP 10, an entry screen for the PIN code displayed on the MFP 10 is another example of the "standby screen". In such a case, the user operation (i.e., entry of the PIN code) may be performed on the MFP 10. In still another example, the screen for accepting a user operation in accordance with the WPS might not necessarily be displayed, and another screen for accepting a user operation in accordance with another system (e.g., AirStation One-Touch Secure System ("AOSS™") (AOSS™ is a trademark owned by Buffalo Inc. of Nagoya, Japan) may be displayed.

Second Variation

The CPU 32 may be configured to execute only one of the processing executed by the MFP 10 having the device status and the processing executed by the MFP 10 having the G/O status. That is, the CPU 32 may be configured to execute only one of the processing in FIG. 3 (and FIG. 4) and the processing in FIG. 6 (and FIG. 7). In a case where the CPU 32 is configured to execute the processing executed by the MFP 10 having the G/O status only, the "first shifting controller", the "second shifting controller", and the "fifth establishment controller" may be omitted.

Third Variation

According to the embodiments, when the MFP 10 shifts to the G/O status (e.g., step S90) after establishing an NFC connection with the second mobile terminal (e.g., YES in step S80 in FIG. 3) or when the MFP 10 shifts to the G/O status (e.g., step S540 in FIG. 16 in the second embodiment) after establishing an NFC connection with the third mobile terminal (e.g., YES in step S110 in FIG. 4), the MFP 10 generates an SSID. Nevertheless, the MFP 10 may generate an SSID to be used in a WFDNW in which the MFP 10 operates as a G/O, prior to such timings. In such a case, in step S80 in FIG. 3, step S110 in FIG. 4, and step S530 in FIG. 16, the NFC I/F 22 may transmit the pre-generated SSID through the established NFC connection instead of the MAC address. That is, the processing of step T325 in FIG. 9 might not necessarily be executed, and in step T322, the MFP 10 may transmit the SSID "X10" instead of the MAC address "M10". In such a case, in step T430 in FIG. 10, steps T829 and T842 in FIG. 17, and step T1030 in FIG. 19, the MFP 10 may transmit the SSID "X10" instead of the MAC address "M10". In step S380 in FIG. 6 and step S420 in FIG. 7, the NFC I/F 22 may transmit the pre-generated SSID through the established NFC connection instead of the MAC address. That is, in step T622 in FIG. 13, the MFP 10 may transmit the SSID "X10" to the mobile terminal 200 instead of the MAC address"M10". In such a case, in step T734 in FIG. 14 and steps T929 and T942 in FIG. 18, the MFP 10 may transmit the SSID "X10" instead of the MAC address "M10".

Fourth Variation

In the first and second embodiments, the NFC I/F 22 might not transmit the information "OK" but may transmit the information "NG" only. That is, when an NFC connection becomes established between the MFP 10 and the second mobile terminal in step S80 in FIG. 3, the NFC I/F 22 might not necessarily transmit the information "OK" to the second mobile terminal through the NFC connection. In such a case, the second mobile terminal may be configured to, where the second mobile terminal does not receive the information "NG" from the NFC I/F 22, determine that the second mobile terminal is allowed to establish a Wi-Fi® connection with the MFP 10. In step S380 in FIG. 6, the same processing may be executed. In the first and second embodiments, the NFC I/F 22 might not transmit the information "NG but may transmit the information "OK" only. That is, when an NFC connection becomes established between the MFP 10 and the third mobile terminal in step S110 in FIG. 4, the NFC I/F 22 might not necessarily transmit the information "NG" to the third mobile terminal through the NFC connection. In such a case, the third mobile terminal may be configured to, where the third mobile terminal does not receive the information "OK" from the NFC I/F 22, determine that the third mobile terminal is allowed to establish a Wi-Fi® connection with the MFP 10. In step S420 in FIG. 7, the same processing may be executed. In the third embodiment, the NFC I/F 22 might not necessarily transmit the information "OK" through the NFC connection. That is, when an NFC connection becomes established between the MFP 10 and the second mobile terminal in step S80 in FIG. 3 or between the MFP 10 and the third mobile terminal in step S110 in FIG. 4, the NFC I/F 22 might not necessarily transmit the information "OK" to the target device (e.g., the second mobile terminal or the third mobile terminal) through the NFC connection. In such a case, each of the second mobile terminal and the third mobile terminal may be configured to, in response to establishment of an NFC connection with the MFP 10, determine that the second mobile terminal or the third mobile terminal is allowed to establish a Wi-Fi® connection with the MFP 10.

Fifth Variation

The "first wireless interface" might not necessarily be the NFC I/F, and may be an interface for enabling other communication such as Bluetooth® (Bluetooth® is a registered trademark owned by BLUETOOTH SIG. INC. of Kirkland, Wash.) communication, infrared communication, or TransferJet™ (TransferJet™ is a trademark owned by Sony Corporation of Tokyo, Japan) communication.

Sixth Variation

The "wireless connection via the second wireless interface" might not necessarily be a wireless connection that complies with the WFD protocol. For example, the "wireless connection via the second wireless interface" may be a wireless connection that compiles with a software enabled access point ("SoftAP") protocol.

Seventh Variation

The "communication device" might not necessarily be capable of performing multiple functions. For example, the "communication device " may be a single function device such as a printer capable of performing a printing function only or a scanner capable of performing a scanning function only, a general-purpose computer, or a mobile terminal.

The technical elements described in the specification and the drawings exhibit technical usability alone or in various combination, and not limited to those in the claims at the time of the application of the disclosure. Furthermore, the techniques described as examples in the specification or drawings may achieve a plurality of objects simultaneously, and has technical utility by achieving any one of these objects.

What is claimed is:

1. A communication device comprising:
   a first wireless interface;
   a second wireless interface, wherein the second wireless interface is different from the first wireless interface;
   a processor; and
   a memory storing computer-readable instructions therein, the computer-readable instructions, when executed by the processor, causing the communication device to:
      receive, via the second wireless interface, a connection request from a first external device;
      after receiving the connection request from the first external device, establish, via the first wireless interface, a connection with a second external device, wherein the second external device is different from the first external device;
      transmit information to the second external device, wherein the information prevents the second external device from establishing, via the second wireless interface, a connection with the communication device; and
      establish, via the second wireless interface, a connection with the first external device.

2. The communication device as in claim 1,
   wherein the information prevents the second external device from sending a first signal
   wherein the first signal being a signal for establishing, via the second wireless interface, the connection between the communication device and the second external device.

3. The communication device as in claim 1, wherein the computer-readable instructions, when executed by the processor, further cause the communication device to:
   determine whether the connection request from a first external device has been received via the second wireless interface;
   establish, via the first wireless interface, a connection with a second external device;
   where the connection request has been received from the first external device,
   transmit, via the first wireless interface, first information to the second external device, wherein the first information prevents the second external device from establishing, via the second wireless interface, a connection with the communication device; and
   where the connection request has not been received from the first external device,
   transmit, via the first wireless interface, second information to the second external device, wherein the second information is configured to cause the second external device to execute sending a first signal, the first signal being a signal for establishing, via the second wireless interface, a wireless connection between the communication device and the second external device; and
   receive, via the second wireless interface, the first signal from the second external device.

4. The communication device as in claim 1, further comprising a display, wherein the computer-readable instructions, when executed by the processor, further cause the communication device to:
   output a selection screen to the display in a first case, the selection screen is a screen for a second user of the second external device to select whether a wireless connection between the communication device and the second external device via the second wireless interface is to be established, wherein the first case is a case where a connection is established, via the first wireless interface, with the second external device after receiving, via the second wireless interface, the connection request from a first external device;

in a second case where the second user selects that a wireless connection between the communication device and the second external device via the second wireless interface is to be established at the selection screen, establish a wireless connection, via the second wireless interface, with the second external device; and in a third case where the second user selects that the wireless connection between the communication device and the second external device via the second wireless interface is not to be established at the selection screen, the establishing the wireless connection, via the second wireless interface, with the first external device without establishing, via the second wireless interface, the wireless connection with the second external device is executed.

5. The communication device as in claim 4, wherein the computer-readable instructions, when executed by the processor, further cause the communication device to:

output a standby screen instead of the selection screen to the display in the third case, wherein the standby screen is a screen for a first user of the first external device to instruct the communication device to establish a connection, via the second wireless interface, with the first external device; and establish, via the second wireless interface, a connection with the first external device where the instruction by the first user of the first external device is executed where the standby screen is displayed.

6. The communication device as in claim 4, wherein the first wireless interface is configured to:

in the first case, send a first information to the second external device, the first information for causing the second external device to not execute sending a first signal, the first signal being a signal for establishing a wireless connection between the communication device and the second external device via the second wireless interface;

where a connection with the second external device via the first wireless interface is established again in the second case, send a second information to the second external device the second information being for causing the second external device to execute sending the first signal; and in the second case, the establishing, via the second wireless interface, the connection with the second external device is executed in response to receiving the first signal from the second external device via the second wireless interface.

7. The communication device as in claim 1, wherein the communication device is capable of selectively operating in one of a plurality of states including a parent station state in which the communication device functions as a parent station of a wireless network, a child station state in which the communication device functions as a child station of a wireless network, and a specific state different from the parent station state and the child station state, wherein a first type of the connection request is received from the first wireless device via the second wireless interface under the situation wherein the state of the external device is the specific state, wherein the computer-readable instructions, when executed by the processor, further cause the communication device to:

execute, via the second wireless interface, a determination communication with the first external device in a first case where the state of the external device is the specific state, wherein the determination communication being for determining which the parent station state or the child state the communication device is to operate, wherein the first case is a case where a connection is established, via the first wireless interface, with the second external device after receiving, via the second wireless interface, the connection request from a first external device, and wherein the determination communication further causes the communication device to:

shift the state of the communication device from the specific state to the parent station state and establish a wireless connection with the first external device via the second wireless interface in a case where determined that the communication device is to operate the parent station state; and shift the state of the communication device from the specific state to the child state and establish a wireless connection with the first external device via the second wireless interface in a case where determined that the communication device is to operate the child state.

8. The communication device as in claim 7, wherein shifting the state of the communication device from the specific state to the parent station state is not executed under the specific situation where the state of the external device is the specific state.

9. The communication device as in claim 7, wherein the computer-readable instructions, when executed by the processor, further cause the communication device to:

shift the state of the communication device from the specific state to the parent station state in the first case where the state of the external device is the specific state;

shift the state of the communication device from the parent station state to the specific state after shifting the state of the communication device from the specific state to the parent station state where an instruction by a first user of the first external device is executed in the first case where the state of the external device is the specific state, wherein the instruction is for the communication device to establish a connection with the first external device via the second wireless interface; and establish, via the second wireless interface, a connection with the second external device after shifting the state of the communication device from the specific state to the parent station state where the instruction by the first user of the first external device is not executed in the first case where the state of the external device is the specific state, wherein the establishing, via the second wireless interface, the connection the first external device without establishing, via the second wireless interface, the connection, with the second external device is executed after shifting the state of the communication device from the parent station state to the specific state where the instruction by the first user of the first external device is executed after shifting the state of the communication device from the specific state to the parent station state in the first case where the state of the external device is the specific state.

10. The communication device as in claim 1,
wherein a second type of the connection request is received from the first wireless device via the second wireless interface in the first case where a state of the external device is a parent station state in which the communication device functions as a parent station of a wireless network, wherein the first case is a case where a connection is established, via the first wireless interface, with the second external device after receiving, via the second wireless interface, the connection request from a first external device, and
wherein the establishing, via the second wireless interface, the connection the first external device without establishing, via the second wireless interface, the connection with the second external device is executed while maintaining the state of the communication device in the parent station state in a case where the instruction by a first user of the first external device is executed in the first case where the state of the external device is the parent station state.

11. The communication device as in claim 1, further comprising a display,
wherein the computer-readable instructions, when executed by the processor, further cause the communication device to:
output a standby screen to the display where the connection request is received, via the second wireless interface, from a first external device, wherein the standby screen is a screen for a first user of the first external device to instruct the communication device to establish a connection, via the second wireless interface, with the first external device, and
wherein the establishing, via the first wireless interface, the connection with a second external device is executed where the instruction by the first user of the first external device is executed where the standby screen is outputted.

12. The communication device as in claim 11, wherein the instruction by the first user of the first external device corresponds to a push button operation of WPS (Wi-Fi Protected Setup).

13. The communication device as in claim 11, further comprising an instruction unit for accepting the instruction by the first user of the first external device.

14. The communication device as in claim 1,
wherein the transmitting the information to the second external device is executed via the first wireless interface.

15. A communication device comprising:
a first wireless interface;
a second wireless interface, wherein the second wireless interface is different from the first wireless interface;
a processor; and
a memory storing computer-readable instructions therein, the computer-readable instructions, when executed by the processor, causing the communication device to:
receive, via the second wireless interface, a connection request from a first external device;
establish, via the first wireless interface, a connection with a second external device;
establish, via the second wireless interface, a connection with the first external device;

determine whether the connection request from a first external device has been received via the second wireless interface;
where the connection request has not been received from the first external device,
transmit, via the first wireless interface, first information to the second external device, wherein the first information is configured to cause the second external device to execute sending a first signal, the first signal being a signal for establishing, via the second wireless interface, a wireless connection between the communication device and the second external device; and
receive, via the second wireless interface, the first signal from the second external device; and
where the connection request has been received from the first external device, the transmitting, via the first wireless interface, first information to the second external device is not executed.

16. The communication device as in claim 15, further comprising a display,
wherein the computer-readable instructions, when executed by the processor, further cause the communication device to:
output a standby screen to the display where the connection request is received, via the second wireless interface, from a first external device, wherein the standby screen is a screen for a first user of the first external device to instruct the communication device to establish a connection, via the second wireless interface, with the first external device, and
wherein the establishing, via the first wireless interface, the connection with a second external device is executed where the instruction by the first user of the first external device is executed where the standby screen is displayed.

17. The communication device as in claim 16, wherein the instruction by the first user of the first external device is corresponding to a push button operation of WPS (Wi-Fi Protected Setup).

18. The communication device as in claim 16, further comprising an instruction unit for accepting the instruction by the first user of the first external device.

19. A non-transitory computer-readable recording medium storing computer-readable instructions for a communication device, wherein the computer-readable instructions, when executed by a processor of the communication device, causing the communication device to:
receive, via a second wireless interface, a connection request from a first external device, wherein the second wireless interface is different from the first wireless interface;
after receiving the connection request from the first external device, establish, via a first wireless interface, a connection with a second external device;
transmit information to the second external device, wherein the information prevents the second external device from establishing, via the second wireless interface, a connection with the communication device; and
establish, via the second wireless interface, a connection with the first external device.

20. A communication device comprising:
a first wireless interface;
a second wireless interface, wherein the second wireless interface is different from the first wireless interface;
a processor; and
a memory storing computer-readable instructions therein, the computer-readable instructions, when executed by the processor, causing the communication device to:

receive, via the second wireless interface, a first connection request from a first external device;
receive, via the first wireless interface, a second connection request from a second external device;
establish, via the first wireless interface, a first connection with a second external device, while preventing transmission of an allow signal, via the second wireless interface, to the second external device; and
establish, via the second wireless interface, a second connection with the first external device.

* * * * *